(12) United States Patent
Maass et al.

(10) Patent No.: US 11,792,644 B2
(45) Date of Patent: Oct. 17, 2023

(54) SESSION KEY GENERATION FOR AUTONOMOUS VEHICLE OPERATION

(71) Applicant: Motional AD LLC, Boston, MA (US)

(72) Inventors: Michael Maass, Pittsburgh, PA (US); Karl Robinson, Norwell, MA (US); Garth Scheidemantel, Gibsonia, PA (US)

(73) Assignee: Motional AD LLC, Boston, MA (US)

( * ) Notice: Subject to any disclaimer, the term of this patent is extended or adjusted under 35 U.S.C. 154(b) by 102 days.

(21) Appl. No.: 17/353,780

(22) Filed: Jun. 21, 2021

(65) Prior Publication Data

US 2022/0408246 A1 Dec. 22, 2022

(51) Int. Cl.
*H04W 12/041* (2021.01)
*H04W 12/0431* (2021.01)
(Continued)

(52) U.S. Cl.
CPC ............ *H04W 12/041* (2021.01); *H04L 9/06* (2013.01); *H04W 8/18* (2013.01); *H04W 12/0431* (2021.01)

(58) Field of Classification Search
CPC . H04W 12/041; H04W 12/0431; H04W 8/18; H04L 9/06
See application file for complete search history.

(56) References Cited

U.S. PATENT DOCUMENTS 8,605,998 B2   12/2013  Samples et al.
8,825,391 B1    9/2014  Urmson et al.
(Continued)

FOREIGN PATENT DOCUMENTS

DE    10330011       2/2005
DE    102019100497   7/2019
(Continued)

OTHER PUBLICATIONS

[No Author Listed], SAE "International Standard J3016: Taxonomy and Definitions for Terms Related," SAE International, Sep. 30, 2016, 30 pages.
(Continued)

*Primary Examiner* — Kevin Bechtel
*Assistant Examiner* — Forrest L Carey
(74) *Attorney, Agent, or Firm* — Fish & Richardson P.C.

(57) ABSTRACT

Methods, apparatus, and systems for session key generation for AV operation are disclosed. In an embodiment, a vehicle service subscriber system generates an entropy. The vehicle service subscriber system is associated with a vehicle service subscriber. The vehicle service subscriber system transmits a synchronization message to a vehicle service provider system associated with at least one vehicle. The synchronization message includes the entropy. The vehicle service subscriber system receives a salt from the vehicle service provider system. The vehicle service subscriber system verifies that the salt was generated using the entropy. The vehicle service subscriber system calculates session keys using the salt. The vehicle service subscriber system receives a protected message from the vehicle service provider system. The vehicle service subscriber system authenticates the protected message using the session keys. The protected message is used to provide a ride involving the at least one vehicle.

19 Claims, 14 Drawing Sheets

(51) Int. Cl.
  *H04L 9/06* (2006.01)
  *H04W 8/18* (2009.01)

(56) References Cited

U.S. PATENT DOCUMENTS

| | | | |
|---|---|---|---|
| 9,875,589 B1* | 1/2018 | Buttolo | G07C 9/00571 |
| 10,152,771 B1 | 12/2018 | Li et al. | |
| 10,436,884 B2 | 10/2019 | Wu et al. | |
| 10,699,167 B1 | 6/2020 | Dowdall et al. | |
| 10,884,131 B1 | 1/2021 | Allais et al. | |
| 10,884,411 B1 | 1/2021 | Allais et al. | |
| 10,928,830 B1 | 2/2021 | Tran et al. | |
| 11,161,525 B2 | 11/2021 | Shikari et al. | |
| 2008/0294894 A1 | 11/2008 | Dubhashi et al. | |
| 2009/0310867 A1 | 12/2009 | Matei et al. | |
| 2011/0239283 A1 | 9/2011 | Chern | |
| 2013/0097265 A1* | 4/2013 | Lee | H04L 51/216 |
| | | | 709/206 |
| 2014/0118716 A1 | 5/2014 | Kaganovich | |
| 2015/0264080 A1 | 9/2015 | Busser et al. | |
| 2015/0319149 A1* | 11/2015 | Alshammari | H04L 9/0869 |
| | | | 713/171 |
| 2016/0191408 A1* | 6/2016 | Yajima | H04L 63/123 |
| | | | 709/225 |
| 2016/0330619 A1 | 11/2016 | Suh | |
| 2016/0379366 A1 | 12/2016 | Shah | |
| 2018/0075320 A1 | 3/2018 | Zermas et al. | |
| 2018/0293447 A1 | 10/2018 | Kawano et al. | |
| 2018/0307921 A1 | 10/2018 | Vallespi-Gonzalez et al. | |
| 2018/0348346 A1 | 12/2018 | Vallespi-Gonzalez et al. | |
| 2018/0349746 A1 | 12/2018 | Vallespi-Gonzalez | |
| 2019/0176323 A1* | 6/2019 | Coady | B25J 9/1676 |
| 2019/0179023 A1 | 6/2019 | Englard et al. | |
| 2019/0258737 A1 | 8/2019 | Wang et al. | |
| 2019/0324148 A1 | 10/2019 | Kim et al. | |
| 2020/0033887 A1 | 1/2020 | Kim | |
| 2020/0145231 A1* | 5/2020 | Trevethan | H04L 9/3255 |
| 2020/0159930 A1 | 5/2020 | Venkateswaran et al. | |
| 2020/0180612 A1 | 6/2020 | Finelt et al. | |
| 2020/0211301 A1 | 7/2020 | Zhang et al. | |
| 2020/0228311 A1 | 7/2020 | Capola | |
| 2020/0257301 A1 | 8/2020 | Weiser et al. | |
| 2020/0267547 A1 | 8/2020 | Tal et al. | |
| 2020/0341466 A1 | 10/2020 | Pham et al. | |
| 2020/0369242 A1 | 11/2020 | Komedani | |
| 2020/0410254 A1 | 12/2020 | Pham et al. | |
| 2021/0064778 A1 | 3/2021 | Vladimerou | |
| 2021/0073363 A1 | 3/2021 | Talha et al. | |
| 2021/0119828 A1 | 4/2021 | Thomas et al. | |
| 2021/0157745 A1 | 5/2021 | Bavishi | |
| 2021/0176071 A1 | 6/2021 | Maass et al. | |
| 2021/0184869 A1* | 6/2021 | Trere | H04L 9/3268 |
| 2021/0188312 A1 | 6/2021 | Shikari et al. | |
| 2022/0024481 A1 | 1/2022 | Shikari et al. | |
| 2022/0407716 A1 | 12/2022 | Maass et al. | |
| 2022/0408245 A1 | 12/2022 | Maass et al. | |

FOREIGN PATENT DOCUMENTS

| | | |
|---|---|---|
| EP | 3490219 | 5/2019 |
| GB | 2471276 | 12/2010 |
| GB | 2576265 | 2/2020 |
| WO | WO 2017/220705 | 12/2017 |
| WO | WO 2018/166747 | 9/2018 |

OTHER PUBLICATIONS

Venčkauskas et al., "A lightweight, protocol for secure video streaming," Sensors, May 2018, 18(5):1554, 15 pages.

* cited by examiner

Broadcast, by a vehicle service provider system having at least one processor, a first salt during a service session to at least one vehicle service subscriber system associated with a vehicle service subscriber, the vehicle service provider system associated with at least one vehicle
1304

Receive, by the vehicle service provider system, a synchronization message from the at least one vehicle service subscriber system, the synchronization message comprises an amount of entropy
1308

Generate, by the vehicle service provider system, a second salt based on the first salt and the amount of entropy
1312

Calculate, by the vehicle service provider system, session keys of the service session based on the second salt
1316

Broadcast, by the vehicle service provider system, an update message to the at least one vehicle service subscriber system, the update message comprising the second salt for decrypting protected messages using the session keys, the protected messages used to provide a ride involving the at least one vehicle
1320

FIG. 13

SESSION KEY GENERATION FOR AUTONOMOUS VEHICLE OPERATION

FIELD OF THE DISCLOSURE

Embodiments relate to operation of vehicles and specifically to session key generation for autonomous vehicle operation.

BACKGROUND

Autonomous vehicle (AV) service providers sometimes use a communications channel to communicate with subscribers of the AV service. However, the use of traditional communications channels is vulnerable to replay attacks against AV service subscribers, for example, when a malicious entity uses the communications channel to transmit spurious messages to the AV service subscribers.

BRIEF DESCRIPTION OF THE DRAWINGS

FIG. 13 is a flowchart illustrating a process for session key generation for AV operation.

DETAILED DESCRIPTION

Figure 1:
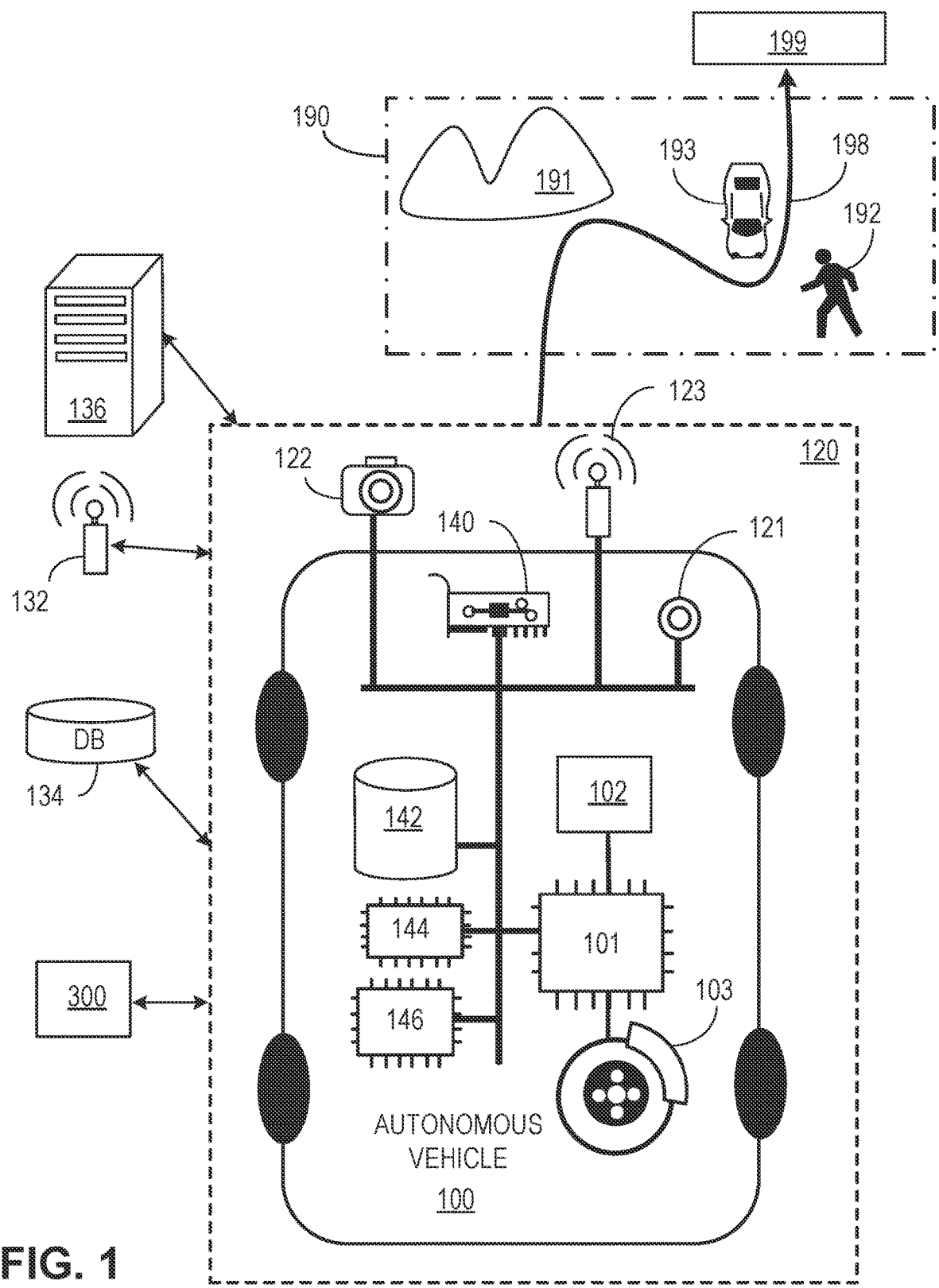
FIG. 1 is a block diagram illustrating an example of an AV having autonomous capability, in accordance with at least one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

In the drawings, specific arrangements or orderings of schematic elements, such as those representing devices, modules, instruction blocks and data elements, are shown for ease of description. However, it should be understood by those skilled in the art that the specific ordering or arrangement of the schematic elements in the drawings is not meant to imply that a particular order or sequence of processing, or separation of processes, is required. Further, the inclusion of a schematic element in a drawing is not meant to imply that such element is required in all embodiments or that the features represented by such element may not be included in or combined with other elements in an embodiment.

Further, in the drawings, where connecting elements, such as solid or dashed lines or arrows, are used to illustrate a connection, relationship, or association between or among two or more other schematic elements, the absence of any such connecting elements is not meant to imply that no connection, relationship, or association can exist. In other words, some connections, relationships, or associations between elements are not shown in the drawings so as not to obscure the disclosure. In addition, for ease of illustration, a single connecting element is used to represent multiple connections, relationships or associations between elements. For example, where a connecting element represents a communication of signals, data, or instructions, it should be understood by those skilled in the art that such element represents one or multiple signal paths (e.g., a bus), as may be needed, to affect the communication.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

Several features are described hereafter that can each be used independently of one another or with any combination of other features. However, any individual feature may not address any of the problems discussed above or might only address one of the problems discussed above. Some of the problems discussed above might not be fully addressed by any of the features described herein. Although headings are provided, information related to a particular heading, but not found in the section having that heading, may also be found elsewhere in this description. Embodiments are described herein according to the following outline:

1. General Overview
2. System Overview
3. AV Architecture
4. Session Key Generation for AV Operation General Overview This document presents methods, systems, and apparatus for session key generation for AV operation. Session keys are single-use symmetric keys calculated by an AV service provider that rents or dispatches AVs to users of an AV service. The session keys are used for encrypting messages in a communication session between the AV service provider and AV service subscribers. The AV service provider incorporates entropy generated by each AV service subscriber into a salt that it uses to calculate session keys. As used herein, "salt" refers to a data such as a random or pseudorandom data that is used as an additional input to the function that is used to calculate the session keys. Each AV service subscriber uses a technique independent of the AV service provider to verify the salt provided by the AV service provider, and to calculate session keys.

The advantages and benefits of the embodiments disclosed herein include the prevention of replay attacks by malicious entities on the subscribers of an AV service. The disclosed embodiments further enable re-keying of an AV service provider-subscriber group on-demand, e.g., when a particular AV service subscriber requests a new ride. The AV service provider can readily generate a new salt (thus, a new session key) and securely notify AV service subscribers of the change. The entropy generated by each AV service subscriber increases the security and robustness of the communication system. Moreover, subscribers and the provider independently determine matching session keys, reducing the computational overhead.

A salt does not change during the lifetime of a session. Hence, an AV service subscriber can avoid monitoring salt messages after successfully authenticating a protected message, reducing data transfer and computation. Entropy is carried forward for a duration of a session, reducing entropy weaknesses at the AV service provider as well as preventing replay attacks. Security is further increased because the generated salt-chain represents a history of all the entropy provided by AV service subscribers in a session. The embodiments disclosed herein also prevent rainbow table attacks by forcing a malicious entity to re-compute the session keys using the salt and entropy. A rainbow table attack is a type of hacking attack where a perpetrator tries to use a rainbow hash table to crack passwords stored in a database system.

System Overview

FIG. 1 is a block diagram illustrating an example of an AV 100 having autonomous capability, in accordance with at least one embodiment.

As used herein, the term "autonomous capability" refers to a function, feature, or facility that enables a vehicle to be partially or fully operated without real-time human intervention, including without limitation fully autonomous vehicles, highly autonomous vehicles, and conditionally autonomous vehicles.

As used herein, an AV is a vehicle that possesses autonomous capability.

As used herein, "vehicle" includes means of transportation of goods or people. For example, cars, buses, trains, airplanes, drones, trucks, boats, ships, submersibles, dirigibles, etc. A driverless car is an example of a vehicle.

As used herein, "trajectory" refers to a path or route to operate an AV from a first spatiotemporal location to second spatiotemporal location. In an embodiment, the first spatiotemporal location is referred to as the initial or starting location and the second spatiotemporal location is referred to as the destination, final location, goal, goal position, or goal location. In some examples, a trajectory is made up of at least one segments (e.g., sections of road) and each segment is made up of at least one blocks (e.g., portions of a lane or intersection). In an embodiment, the spatiotemporal locations correspond to real world locations. For example, the spatiotemporal locations are pick up or drop-off locations to pick up or drop-off persons or goods.

As used herein, "sensor(s)" includes at least one hardware components that detect information about the environment surrounding the sensor. Some of the hardware components can include sensing components (e.g., image sensors, biometric sensors), transmitting and/or receiving components (e.g., laser or radio frequency wave transmitters and receivers), electronic components such as analog-to-digital converters, a data storage device (such as a random-access memory (RAM) and/or a non-volatile storage), software or firmware components and data processing components such as an ASIC (application-specific integrated circuit), a microprocessor and/or a microcontroller.

As used herein, a "scene description" is a data structure (e.g., list) or data stream that includes at least one classified or labeled objects detected by at least one sensors on the AV vehicle or provided by a source external to the AV.

As used herein, a "road" is a physical area that can be traversed by a vehicle, and may correspond to a named thoroughfare (e.g., city street, interstate freeway, etc.) or may correspond to an unnamed thoroughfare (e.g., a driveway in a house or office building, a section of a parking lot, a section of a vacant lot, a dirt path in a rural area, etc.). Because some vehicles (e.g., 4-wheel-drive pickup trucks, sport utility vehicles, etc.) are capable of traversing a variety of physical areas not specifically adapted for vehicle travel, a "road" may be a physical area not formally defined as a thoroughfare by any municipality or other governmental or administrative body.

As used herein, a "lane" is a portion of a road that can be traversed by a vehicle and may correspond to most or all of the space between lane markings, or may correspond to only some (e.g., less than 50%) of the space between lane markings. For example, a road having lane markings spaced far apart might accommodate two or more vehicles between the markings, such that one vehicle can pass the other without traversing the lane markings, and thus could be interpreted as having a lane narrower than the space between the lane markings or having two lanes between the lane markings. A lane could also be interpreted in the absence of lane markings. For example, a lane may be defined based on physical features of an environment, e.g., rocks and trees along a thoroughfare in a rural area.

"At least one" includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a," "an" and "the" are intended to include the plural forms as well, unless the context clearly indicates otherwise. It will also be understood that the term "and/or" as used herein refers to and encompasses any and all possible combinations of at least one of the associated listed items. It will be further understood that the terms "includes," "including,"

"includes," and/or "including," when used in this description, specify the presence of stated features, integers, elements, operations, elements, and/or components, but do not preclude the presence or addition of at least one other features, integers, elements, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, an AV system refers to the AV along with the array of hardware, software, stored data, and data generated in real-time that supports the operation of the AV. In an embodiment, the AV system is incorporated within the AV. In an embodiment, the AV system is spread across several locations. For example, some of the software of the AV system is implemented on a cloud computing environment similar to cloud computing environment 300 described below with respect to FIG. 3.

In general, this document describes technologies applicable to any vehicles that have at least one autonomous capabilities including fully AVs, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). The technologies described in this document are also applicable to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). In an embodiment, at least one of the Level 1, 2, 3, 4 and 5 vehicle systems may automate certain vehicle operations (e.g., steering, braking, and using maps) under certain operating conditions based on processing of sensor inputs. The technologies described in this document can benefit vehicles in any levels, ranging from fully autonomous vehicles to human-operated vehicles.

Referring to FIG. 1, an AV system 120 operates the AV 100 along a trajectory 198 through an environment 190 to a destination 199 (sometimes referred to as a final location) while avoiding objects (e.g., natural obstructions 191, vehicles 193, pedestrians 192, cyclists, and other obstacles) and obeying rules of the road (e.g., rules of operation or driving preferences).

In an embodiment, the AV system 120 includes devices 101 that are instrumented to receive and act on operational commands from the computer processors 146. In an embodiment, computing processors 146 are similar to the processor 304 described below in reference to FIG. 3. Examples of devices 101 include a steering control 102, brakes 103, gears, accelerator pedal or other acceleration control mechanisms, windshield wipers, side-door locks, window controls, and turn-indicators.

In an embodiment, the AV system 120 includes sensors 121 for measuring or inferring properties of state or condition of the AV 100, such as the AV's position, linear velocity and acceleration, angular velocity and acceleration, and heading (e.g., an orientation of the leading end of AV 100). Example of sensors 121 are global navigation satellite system (GNSS), inertial measurement units (IMU) that measure both vehicle linear accelerations and angular rates, wheel sensors for measuring or estimating wheel slip ratios, wheel brake pressure or braking torque sensors, engine torque or wheel torque sensors, and steering angle and angular rate sensors.

In an embodiment, the sensors 121 also include sensors for sensing or measuring properties of the AV's environment. For example, monocular or stereo video cameras 122 in the visible light, infrared or thermal (or both) spectra, LiDAR 123, RADAR, ultrasonic sensors, time-of-flight (TOF) depth sensors, speed sensors, temperature sensors, humidity sensors, and precipitation sensors.

In an embodiment, the AV system 120 includes a data storage unit 142 and memory 144 for storing machine instructions associated with computer processors 146 or data collected by sensors 121. In an embodiment, the data storage unit 142 is similar to the ROM 308 or storage device 310 described below in relation to FIG. 3. In an embodiment, memory 144 is similar to the main memory 306 described below. In an embodiment, the data storage unit 142 and memory 144 store historical, real-time, and/or predictive information about the environment 190. In an embodiment, the stored information includes maps, driving performance, traffic congestion updates or weather conditions. In an embodiment, data relating to the environment 190 is transmitted to the AV 100 via a communications channel from a remotely located database 134.

In an embodiment, the AV system 120 includes communications devices 140 for communicating measured or inferred properties of other vehicles' states and conditions, such as positions, linear and angular velocities, linear and angular accelerations, and linear and angular headings to the AV 100. These devices include Vehicle-to-Vehicle (V2V) and Vehicle-to-Infrastructure (V2I) communication devices and devices for wireless communications over point-to-point or ad hoc networks or both. In an embodiment, the communications devices 140 communicate across the electromagnetic spectrum (including radio and optical communications) or other media (e.g., air and acoustic media). A combination of Vehicle-to-Vehicle (V2V) Vehicle-to-Infrastructure (V2I) communication (and, in an embodiment, at least one other types of communication) is sometimes referred to as Vehicle-to-Everything (V2X) communication. V2X communication typically conforms to at least one communications standards for communication with, between, and among autonomous vehicles.

In an embodiment, the communication devices 140 include communication interfaces. For example, wired, wireless, WiMAX, Wi-Fi, Bluetooth, satellite, cellular, optical, near field, infrared, or radio interfaces. The communication interfaces transmit data from a remotely located database 134 to AV system 120. In an embodiment, the remotely located database 134 is embedded in a cloud computing environment 200 as described in FIG. 2. The communication interfaces 140 transmit data collected from sensors 121 or other data related to the operation of AV 100 to the remotely located database 134. In an embodiment, communication interfaces 140 transmit information that relates to teleoperations to the AV 100. In an embodiment, the AV 100 communicates with other remote (e.g., "cloud") servers 136.

In an embodiment, the remotely located database 134 also stores and transmits digital data (e.g., storing data such as road and street locations). Such data is stored on the memory 144 on the AV 100, or transmitted to the AV 100 via a communications channel from the remotely located database 134.

In an embodiment, the remotely located database 134 stores and transmits historical information about driving properties (e.g., speed and acceleration profiles) of vehicles that have previously traveled along trajectory 198 at similar times of day. In one implementation, such data may be stored on the memory 144 on the AV 100, or transmitted to the AV 100 via a communications channel from the remotely located database 134.

Computing devices 146 located on the AV 100 algorithmically generate control actions based on both real-time sensor data and prior information, allowing the AV system 120 to execute its autonomous driving capabilities.

In an embodiment, the AV system 120 includes computer peripherals 132 coupled to computing devices 146 for providing information and alerts to, and receiving input from, a user (e.g., an occupant or a remote user) of the AV 100. In an embodiment, peripherals 132 are similar to the display 312, input device 314, and cursor controller 316 discussed below in reference to FIG. 3. The coupling is wireless or wired. Any two or more of the interface devices may be integrated into a single device.

Example Cloud Computing Environment

Figure 2:
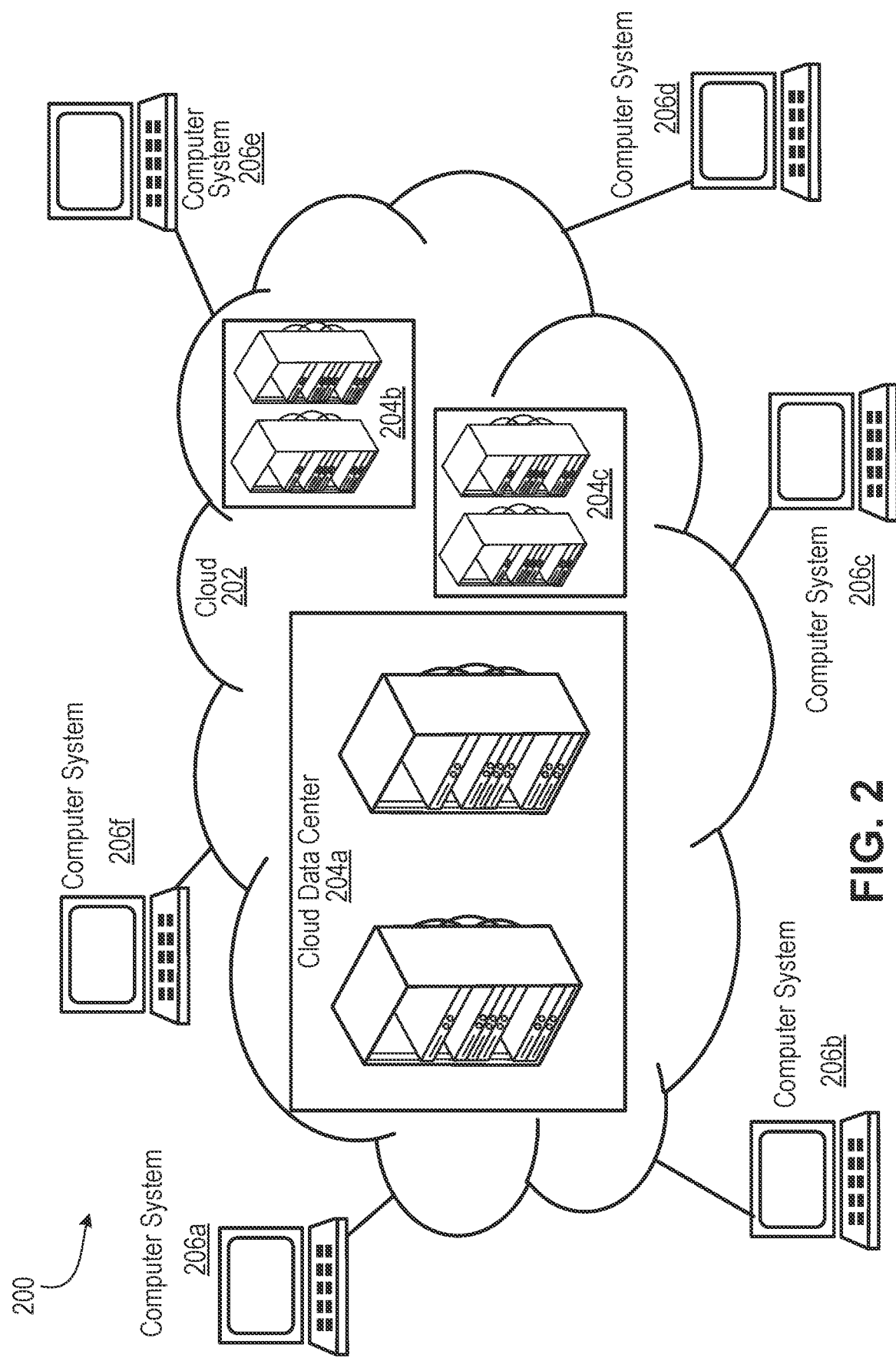
FIG. 2 is a block diagram illustrating an example "cloud" computing environment, in accordance with at least one embodiment.

FIG. 2 is a block diagram illustrating an example "cloud" computing environment, in accordance with at least one embodiment. Cloud computing is a model of service delivery for enabling convenient, on-demand network access to a shared pool of configurable computing resources (e.g. networks, network bandwidth, servers, processing, memory, storage, applications, virtual machines, and services). In typical cloud computing systems, at least one large cloud data centers house the machines used to deliver the services provided by the cloud. Referring now to FIG. 2, the cloud computing environment 200 includes cloud data centers 204a, 204b, and 204c that are interconnected through the cloud 202. Data centers 204a, 204b, and 204c provide cloud computing services to computer systems 206a, 206b, 206c, 206d, 206e, and 206f connected to cloud 202.

The cloud computing environment 200 includes at least one cloud data centers. In general, a cloud data center, for example the cloud data center 204a shown in FIG. 2, refers to the physical arrangement of servers that make up a cloud, for example the cloud 202 shown in FIG. 2, or a particular portion of a cloud. For example, servers are physically arranged in the cloud datacenter into rooms, groups, rows, and racks. A cloud datacenter has at least one zones, which include at least one rooms of servers. Each room has at least one rows of servers, and each row includes at least one racks. Each rack includes at least one individual server nodes. In some implementation, servers in zones, rooms, racks, and/or rows are arranged into groups based on physical infrastructure requirements of the datacenter facility, which include power, energy, thermal, heat, and/or other requirements. In an embodiment, the server nodes are similar to the computer system described in FIG. 3. The data center 204a has many computing systems distributed through many racks.

The cloud 202 includes cloud data centers 204a, 204b, and 204c along with the network and networking resources (for example, networking equipment, nodes, routers, switches, and networking cables) that interconnect the cloud data centers 204a, 204b, and 204c and help facilitate the computing systems' 206a-f access to cloud computing services. In an embodiment, the network represents any combination of at least one local networks, wide area networks, or internetworks coupled using wired or wireless links deployed using terrestrial or satellite connections. Data exchanged over the network, is transferred using any number of network layer protocols, such as Internet Protocol (IP), Multiprotocol Label Switching (MPLS), Asynchronous Transfer Mode (ATM), Frame Relay, etc. Furthermore, in embodiments where the network represents a combination of multiple sub-networks, different network layer protocols are used at each of the underlying sub-networks. In an embodiment, the network represents at least one interconnected internetworks, such as the public Internet.

The computing systems 206a-f or cloud computing services consumers are connected to the cloud 202 through network links and network adapters. In an embodiment, the computing systems 206a-f are implemented as various computing devices, for example servers, desktops, laptops, tablet, smartphones, Internet of Things (IoT) devices, autonomous vehicles (including, cars, drones, shuttles, trains, buses, etc.) and consumer electronics. In an embodiment, the computing systems 206a-f are implemented in or as a part of other systems.

Computer System

Figure 3:
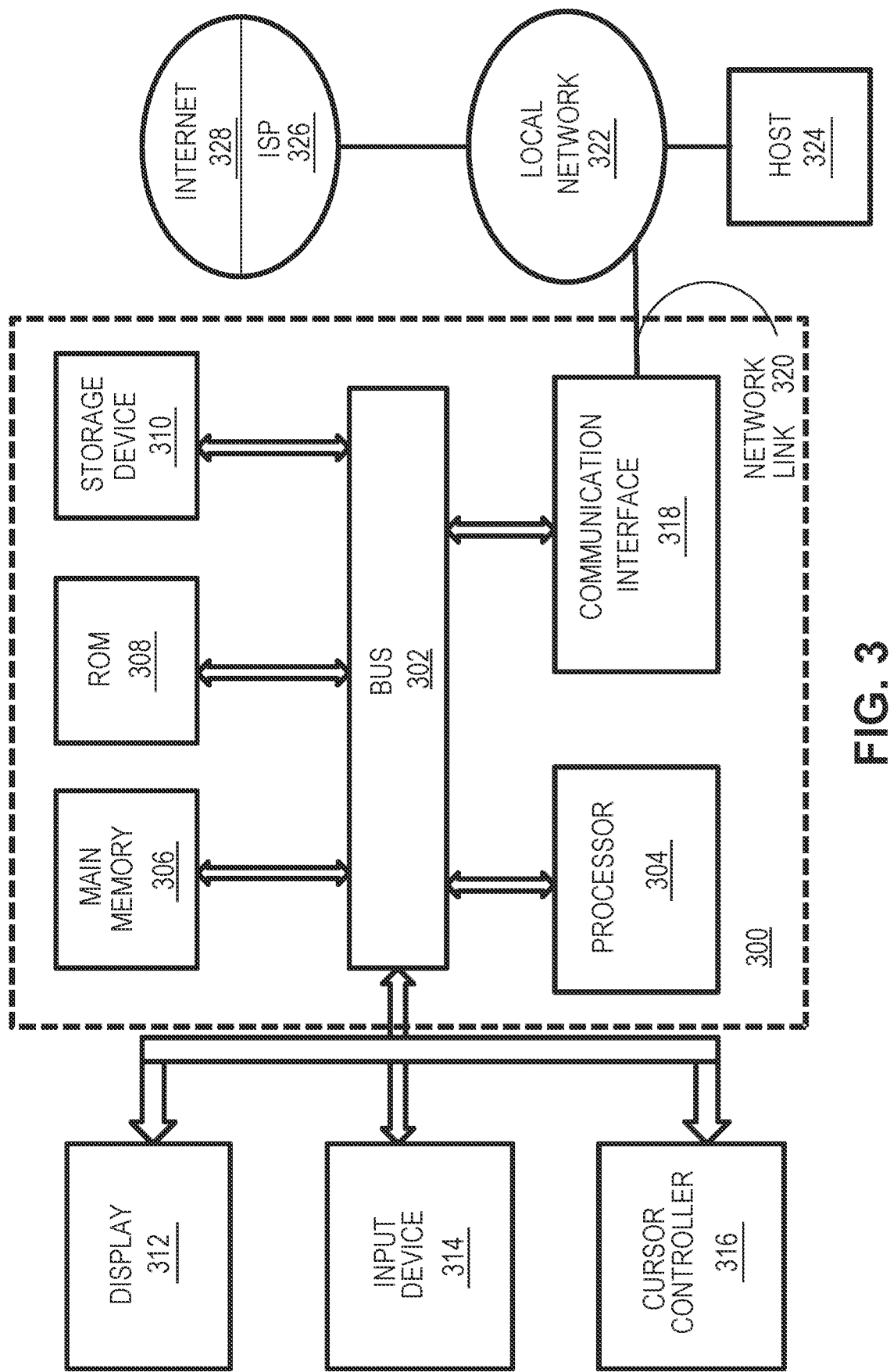
FIG. 3 is a block diagram illustrating a computer system, in accordance with at least one embodiment.

FIG. 3 is a block diagram illustrating a computer system 300, in accordance with at least one embodiment. In an implementation, the computer system 300 is a special-purpose computing device. The special-purpose computing device is hard-wired to perform the techniques or includes digital electronic devices such as at least one ASICs or field programmable gate arrays (FPGAs) that are persistently programmed to perform the techniques or may include at least one general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. In various embodiments, the special-purpose computing devices are desktop computer systems, portable computer systems, handheld devices, network devices or any other device that incorporates hard-wired and/or program logic to implement the techniques.

In an embodiment, the computer system 300 includes a bus 302 or other communication mechanism for communicating information, and a hardware processor 304 coupled with a bus 302 for processing information. The hardware processor 304 is, for example, a general-purpose microprocessor. The computer system 300 also includes a main memory 306, such as a RAM or other dynamic storage device, coupled to the bus 302 for storing information and instructions to be executed by processor 304. In one implementation, the main memory 306 is used for storing temporary variables or other intermediate information during execution of instructions to be executed by the processor 304. Such instructions, when stored in non-transitory storage media accessible to the processor 304, render the computer system 300 into a special-purpose machine that is customized to perform the operations specified in the instructions.

In an embodiment, the computer system 300 further includes a read only memory (ROM) 308 or other static storage device coupled to the bus 302 for storing static information and instructions for the processor 304. A storage device 310, such as a magnetic disk, optical disk, solid-state drive, or three-dimensional cross point memory is provided and coupled to the bus 302 for storing information and instructions.

In an embodiment, the computer system 300 is coupled via the bus 302 to a display 312, such as a cathode ray tube (CRT), a liquid crystal display (LCD), plasma display, light emitting diode (LED) display, or an organic light emitting diode (OLED) display for displaying information to a computer user. An input device 314, including alphanumeric and other keys, is coupled to bus 302 for communicating information and command selections to the processor 304. Another type of user input device is a cursor controller 316, such as a mouse, a trackball, a touch-enabled display, or cursor direction keys for communicating direction information and command selections to the processor 304 and for controlling cursor movement on the display 312. This input device typically has two degrees of freedom in two axes, a first axis (e.g., x-axis) and a second axis (e.g., y-axis), that allows the device to specify positions in a plane.

According to one embodiment, the techniques herein are performed by the computer system 300 in response to the processor 304 executing at least one sequences of at least one instructions contained in the main memory 306. Such instructions are read into the main memory 306 from another storage medium, such as the storage device 310. Execution of the sequences of instructions contained in the main memory 306 causes the processor 304 to perform the process elements described herein. In alternative embodiments, hard-wired circuitry is used in place of or in combination with software instructions.

The term "storage media" as used herein refers to any non-transitory media that store data and/or instructions that cause a machine to operate in a specific fashion. Such storage media includes non-volatile media and/or volatile media. Non-volatile media includes, for example, optical disks, magnetic disks, solid-state drives, or three-dimensional cross point memory, such as the storage device 310. Volatile media includes dynamic memory, such as the main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NV-RAM, or any other memory chip or cartridge.

Storage media is distinct from but may be used in conjunction with transmission media. Transmission media participates in transferring information between storage media. For example, transmission media includes coaxial cables, copper wire and fiber optics, including the wires that include the bus 302. Transmission media can also take the form of acoustic or light waves, such as those generated during radio-wave and infrared data communications.

In an embodiment, various forms of media are involved in carrying at least one sequences of at least one instructions to the processor 304 for execution. For example, the instructions are initially carried on a magnetic disk or solid-state drive of a remote computer. The remote computer loads the instructions into its dynamic memory and send the instructions over a telephone line using a modem. A modem local to the computer system 300 receives the data on the telephone line and use an infrared transmitter to convert the data to an infrared signal. An infrared detector receives the data carried in the infrared signal and appropriate circuitry places the data on the bus 302. The bus 302 carries the data to the main memory 306, from which processor 304 retrieves and executes the instructions. The instructions received by the main memory 306 may optionally be stored on the storage device 310 either before or after execution by processor 304.

The computer system 300 also includes a communication interface 318 coupled to the bus 302. The communication interface 318 provides a two-way data communication coupling to a network link 320 that is connected to a local network 322. For example, the communication interface 318 is an integrated service digital network (ISDN) card, cable modem, satellite modem, or a modem to provide a data communication connection to a corresponding type of telephone line. As another example, the communication interface 318 is a local area network (LAN) card to provide a data communication connection to a compatible LAN. In some implementations, wireless links are also implemented. In any such implementation, the communication interface 318 sends and receives electrical, electromagnetic, or optical signals that carry digital data streams representing various types of information.

The network link 320 typically provides data communication through at least one networks to other data devices. For example, the network link 320 provides a connection through the local network 322 to a host computer 324 or to a cloud data center or equipment operated by an Internet Service Provider (ISP) 326. The ISP 326 in turn provides data communication services through the world-wide packet data communication network now commonly referred to as the "Internet" 328. The local network 322 and Internet 328 both use electrical, electromagnetic, or optical signals that carry digital data streams. The signals through the various networks and the signals on the network link 320 and through the communication interface 318, which carry the digital data to and from the computer system 300, are example forms of transmission media. In an embodiment, the network 320 contains the cloud 202 or a part of the cloud 202 described above.

The computer system 300 sends messages and receives data, including program code, through the network(s), the network link 320, and the communication interface 318. In an embodiment, the computer system 300 receives code for processing. The received code is executed by the processor 304 as it is received, and/or stored in storage device 310, or other non-volatile storage for later execution.

Autonomous Vehicle Architecture

Figure 4:
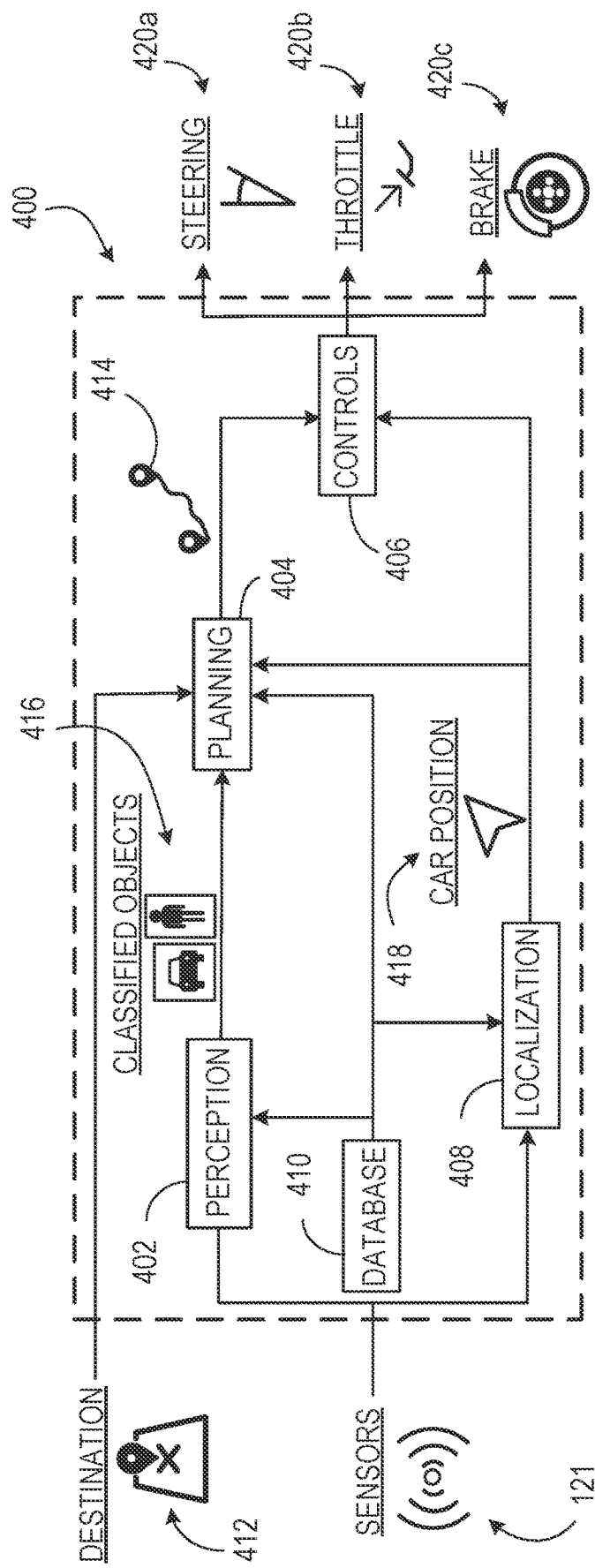
FIG. 4 is a block diagram illustrating an example architecture for an AV, in accordance with at least one embodiment.

FIG. 4 is a block diagram illustrating an example architecture 400 for an AV (e.g., the AV 100 shown in FIG. 1), in accordance with at least one embodiment. The architecture 400 includes a perception module 402 (sometimes referred to as a perception circuit), a planning module 404 (sometimes referred to as a planning circuit), a control module 406 (sometimes referred to as a control circuit), a localization module 408 (sometimes referred to as a localization circuit), and a database module 410 (sometimes referred to as a database circuit). Each module plays a role in the operation of the AV 100. Together, the modules 402, 404, 406, 408, and 410 may be part of the AV system 120 shown in FIG. 1. In an embodiment, any of the modules 402, 404, 406, 408, and 410 is a combination of computer software (e.g., executable code stored on a computer-readable medium) and computer hardware (e.g., at least one microprocessors, microcontrollers, application-specific integrated circuits [ASICs]), hardware memory devices, other types of integrated circuits, other types of computer hardware, or a combination of any or all of these things).

In use, the planning module 404 receives data representing a destination 412 and determines data representing a trajectory 414 (sometimes referred to as a route) that can be traveled by the AV 100 to reach (e.g., arrive at) the destination 412. In order for the planning module 404 to determine the data representing the trajectory 414, the planning module 404 receives data from the perception module 402, the localization module 408, and the database module 410.

The perception module 402 identifies nearby physical objects using at least one sensors 121, e.g., as also shown in FIG. 1. The objects are classified (e.g., grouped into types such as pedestrian, bicycle, automobile, traffic sign, etc.) and a scene description including the classified objects 416 is provided to the planning module 404.

The planning module 404 also receives data representing the AV position 418 from the localization module 408. The localization module 408 determines the AV position by using data from the sensors 121 and data from the database module 410 (e.g., a geographic data) to calculate a position. For example, the localization module 408 uses data from a GNSS unit and geographic data to calculate a longitude and latitude of the AV. In an embodiment, data used by the localization module 408 includes high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations of them), and maps describing the spatial locations of road features such as crosswalks, traffic signs or other travel signals of various types.

The control module 406 receives the data representing the trajectory 414 and the data representing the AV position 418 and operates the control functions 420a-c (e.g., steering, throttling, braking, ignition) of the AV in a manner that will cause the AV 100 to travel the trajectory 414 to the destination 412. For example, if the trajectory 414 includes a left turn, the control module 406 will operate the control functions 420a-c in a manner such that the steering angle of the steering function will cause the AV 100 to turn left and the throttling and braking will cause the AV 100 to pause and wait for passing pedestrians or vehicles before the turn is made.

Session Key Generation for AV Operation

Figure 5:
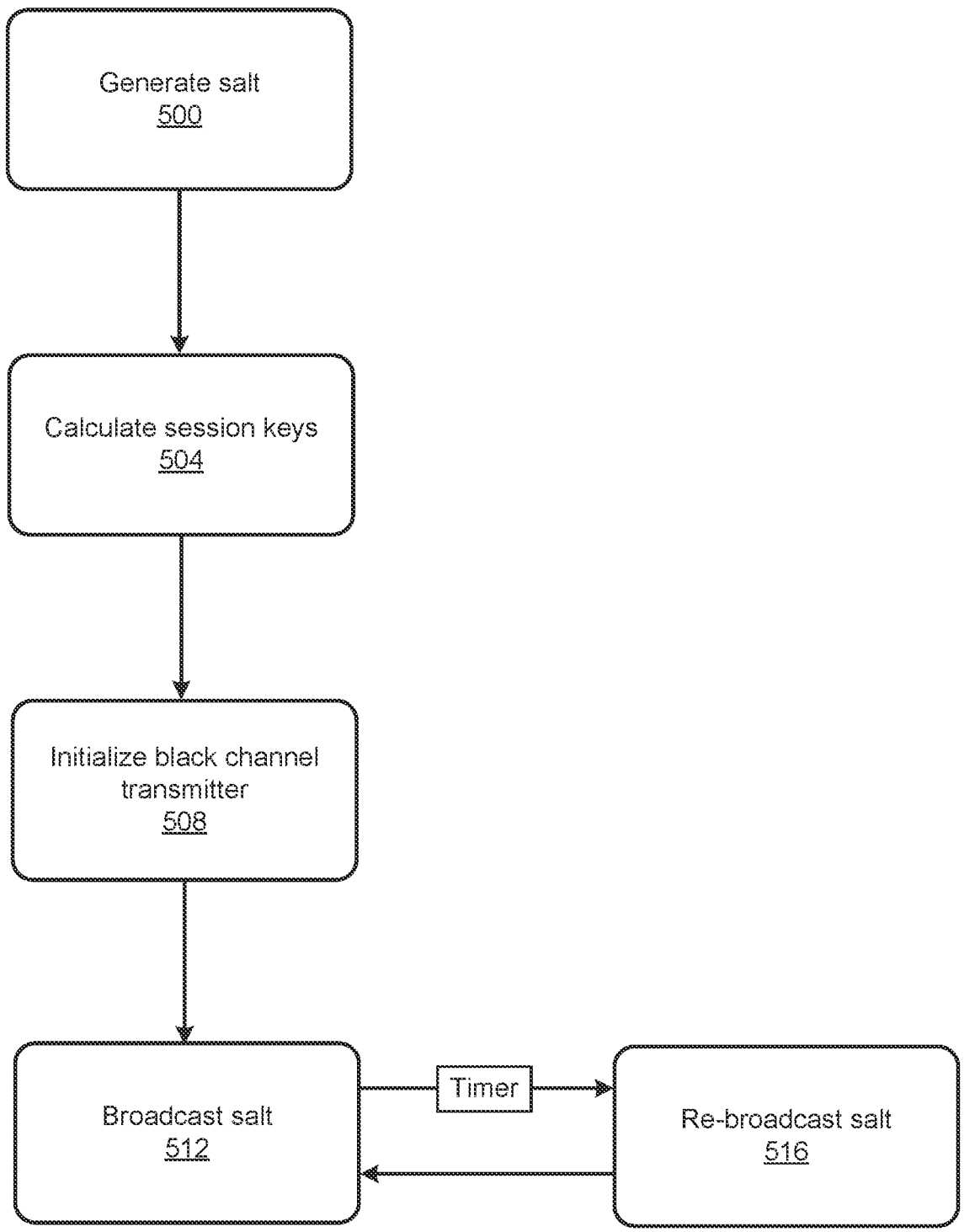
FIG. 5 is a flowchart illustrating a process for session key generation for AV operation, in accordance with at least one embodiment.

FIG. 5 is a flowchart illustrating an example process for session key generation for operation of AVs, in accordance with at least one embodiment. At least one AV operated using the process is the same as or similar to the AV 100 illustrated and described in more detail with reference to FIG. 1. In an embodiment, the process of FIG. 5 is performed by a vehicle service provider system. The vehicle service provider system is the same as or similar to the AV service provider system 704 illustrated and described in more detail with reference to FIG. 7. Other entities, for example, a server or a computer system perform some or all of the elements of the process in other embodiments. The server is the same as or similar to, for example, server 136, and the computer system is the same as or similar to, for example, computer system 300. It will be understood that the embodiment of FIG. 5 is intended as one example process, and other embodiments include different elements, more or fewer elements, or elements performed in a different order.

As used herein, a vehicle service provider system refers to a computer system that provides an AV for hire to be used by a single passenger or a group of passengers either for a non-shared ride or for a car-pooled (shared) ride. The vehicle service provider system is implemented using at least one processor, for example, processor 304. The vehicle service provider system conveys passengers between locations of their choice in an AV. In an embodiment, a vehicle service provider system rents AVs for short periods of time, generally ranging from a few hours to a few weeks. A vehicle service provider system serves passengers who require a temporary vehicle, for example, those who do not own their own car, travelers who are out of town, or owners of damaged or destroyed vehicles who are awaiting repair or insurance compensation. In an embodiment, a vehicle service provider system rents autonomous vans or trucks for moving goods. A vehicle service provider system is implemented using the components of the example computer system 300 illustrated and described in more detail with reference to FIG. 3. In an embodiment, a vehicle service provider system functions as a ridesharing provider for AVs, for example, a system that, via websites and mobile apps, matches passengers with AVs for hire.

A vehicle service subscriber system, as described herein, refers to a computer system that responds to communication from a vehicle service provider system for the purpose of ride hailing or providing an AV ride to a vehicle service subscriber in an AV associated with the vehicle service provider system. In an embodiment, the vehicle service subscriber system is the same as or similar to the AV service subscriber system 708. In an embodiment, an AV ride is hailed using a mobile app running on a vehicle service subscriber system. In an embodiment, a vehicle service subscriber system is part of a mobile device, such as a smartphone, a laptop, a tablet, or a personal digital assistant and implemented using the components of the example computer system 300. For example, a vehicle service subscriber (e.g., a mobile app or a user) sets up a personal profile with a name, phone number, other information, or payment preference on a vehicle service subscriber system.

In an alternative or additional embodiment, the vehicle service provider is a sensor such as one of sensors 121. The vehicle service subscriber system is a high performance compute node (or a task running thereon) that uses the data provided by the sensor. One example of such a compute node is processor 304. In this embodiment, the session keys described herein would be used to protect messages or data passed between the sensor and the processor. In other embodiments, the vehicle service provider system and the vehicle service subscriber system could be other in-vehicle systems or elements as described with reference to other FIGS. herein.

In an embodiment, a vehicle service subscriber system is part of an AV system, for example, the AV system 120 and implemented using, for example, processor 146. For example, in one embodiment the vehicle service subscriber is a software client running on the vehicle service subscriber system or AV system. A vehicle service provider system thus communicates with a vehicle service subscriber system built into an AV system, such that the AV is operated using commands or messages sent by the vehicle service provider system to the vehicle service subscriber system.

For secure communications between a vehicle service provider system and a group of vehicle service subscriber systems, protected messages are used for message exchange. The protected message can be, for example, a black channel message. Embodiments herein will be described with reference to the specific example of a black channel message, however it will be understood that other embodiments can include a different type of encryption or protection protocol Using black channel messages, safety-relevant data as well as diagnostic information is exchanged via existing network connections, for example, a local network 322 or the Internet 328. The vehicle service provider system broadcasts a salt to one or more vehicle service subscriber systems for generation of session keys for a communication session. As described above, "salt" refers to random or pseudorandom data that is generated by a vehicle service provider system and used by each vehicle service subscriber system to calculate session keys. For example, a vehicle service subscriber system uses the salt as an input to a function that hashes pre-shared data such as keys, data, a password, or passphrase.

The session keys are used to authenticate, decode, or decrypt protected (e.g., black channel) messages passed between a vehicle service provider system and the vehicle service subscriber systems. A black channel message is for providing a ride to a passenger (a vehicle service subscriber) in an AV associated with a vehicle service provider system. For example, a black channel message includes geographical data related to a start point of an AV ride, geographical data related to a destination of an AV ride, a number of passengers of an AV ride, an amount of luggage that will be carried by an AV, carpool details, route details, information about a make and model of the AV, identity of the passengers, or speed data of the AV. As previously described, such message include one or more of sensor data, vehicle diagnostic data, vehicle commands, vehicle state data, or some other type of data.

The embodiments disclosed herein prevent replay attacks by a malicious entity by enabling each vehicle service subscriber system to generate and contribute an entropy to the salt. A replay attack refers to a network attack in which a valid data transmission (e.g., a black channel message or salt message) is maliciously or fraudulently repeated or delayed by a malicious entity. For example, a malicious entity that intercepts a black channel message meant for a vehicle service subscriber system can launch a replay attack using the black channel message as part of a spoofing attack by IP packet substitution. The embodiments disclosed herein prevent such attacks using the entropy, and also enable the vehicle service subscriber systems and the vehicle service provider system to calculate the same session keys for a communication session, thus obviating excessive computational load. Embodiments may provide additional benefits such as anti-spoofing, anti-tampering, etc.

Referring to FIG. 5, a vehicle service provider system generates (500) a salt for encryption of session keys for a communication session with at least one vehicle service subscriber system. The salt includes random bits that are added to an instance of a password (e.g., session keys) before the password is hashed. In an additional or alternative embodiment, the salt includes pre-shared data that is known to both the vehicle service provider system and the vehicle service subscriber system. In an embodiment, the vehicle service provider system selects a salt from an entropy pool. In one embodiment, entropy refers to an average level of information inherent in a random variable's possible values. In another embodiment, entropy refers to a set of random data (e.g., a mix of random data from various sources). For example, entropy represents a mathematical limit on lossless compression of data onto a noiseless channel. The salt is used to create unique passwords even when the vehicle service provider system and each vehicle service subscriber system use the same pre-shared data.

One advantage of embodiments disclosed herein is that embodiments allow for disparate subscribers and publishers to agree on unique keys for different sessions (e.g., boot of the vehicle or when the vehicle is giving an occupant a ride) starting with just pre-shared data. Another advantage of embodiments disclosed herein is the prevention of rainbow table attacks by forcing a malicious entity to re-compute the session keys using the salts. A rainbow table attack is a type of hacking attack where a perpetrator tries to use a rainbow hash table to crack passwords stored in a database system.

The vehicle service provider system calculates session keys (504) using the salt. In an embodiment, the session keys are calculated using a hashed key derivation function (HKDF), an input key material (IKM) and the salt. For example, the session keys are determined using an HKDF based on a hash-based message authentication code (HMAC). A session key is an encryption and decryption key that is randomly calculated to ensure the security of a communications session between a vehicle service provider system and each vehicle service subscriber system. Session keys are sometimes called symmetric keys, because the same key is used for both encryption and decryption of black channel messages passed between the vehicle service provider system and each vehicle service subscriber system. An HKDF is a key derivation function (KDF) based on an HMAC. An HKDF is used as a building block in various protocols and applications, as well as to prevent the proliferation of multiple KDF mechanisms. An HMAC is a type of message authentication code (MAC) involving a cryptographic hash function and a secret cryptographic key (e.g., a salt). In an embodiment, an IKM, which is a cryptographically strong pseudorandom string, is used for extracting a fixed-length pseudorandom key. The fixed-length pseudorandom key is expanded into several additional pseudorandom keys (the output of the HKDF), represented as follows in equation (1)

$$\text{session keys} = [\text{HKDF}(IKM, \text{salt})] \quad (1)$$

The vehicle service provider system initializes (508) its protected message (e.g., black channel) transmitter using the session keys, such that it is ready to transmit black channel messages to the vehicle service subscriber systems for the purpose of scheduling and providing a ride in AVs to users of the vehicle service subscriber systems. The black channel transmitter is a part of the vehicle service provider system and is implemented using the components of the example computer system 300 illustrated and described in more detail with reference to FIG. 3. The vehicle service provider system commences broadcasting black channel protected messages to the vehicle service subscriber systems. Periodically a salt message, containing the salt generated or selected at startup, is broadcast.

In an embodiment, the first one or more black channel protected messages are broadcast by a vehicle service provider system to the group of vehicle service subscriber systems for one or more vehicle service subscriber systems of the group to authenticate the black channel message(s) and their session keys. After the session keys and the first one or more black channel protected messages are authenticated, each next black channel message is transmitted from the vehicle service provider system to a respective vehicle service subscriber system for whom the black channel message is meant. Such a black channel message carries confidential or protected information related to a particular AV ride associated with the respective vehicle service subscriber system. For example, the black channel message includes details of the destination of the ride, time of the ride, passenger identity, route information or number of passengers.

The vehicle service provider system broadcasts (512) the salt that it generated or selected in element 500 to the vehicle service subscriber systems to inform the vehicle service subscriber systems of the salt. For example, the salt is sent within a salt message containing other metadata. An example salt message is represented as:

```
Salt Message
{
  salt
}
```

A new vehicle service subscriber system that joins the session receives the salt in this manner. The vehicle service provider system uses a timer to periodically re-broadcast (516) the salt, such that new vehicle service subscriber systems that join receive the salt. In an embodiment, the timer is an electronic timer, such as a quartz timer having digital electronics, an integrated circuit timer, a software timer, or a programmable logic controller (PLC) having ladder logic. Each vehicle service subscriber system uses the salt to calculate the session keys in the same manner as described for the vehicle service provider system in element 504. The session keys are used to decode or decrypt the black channel messages from the vehicle service provider systems for providing rides in one or more AVs associated with the vehicle service provider system.

Figure 6:
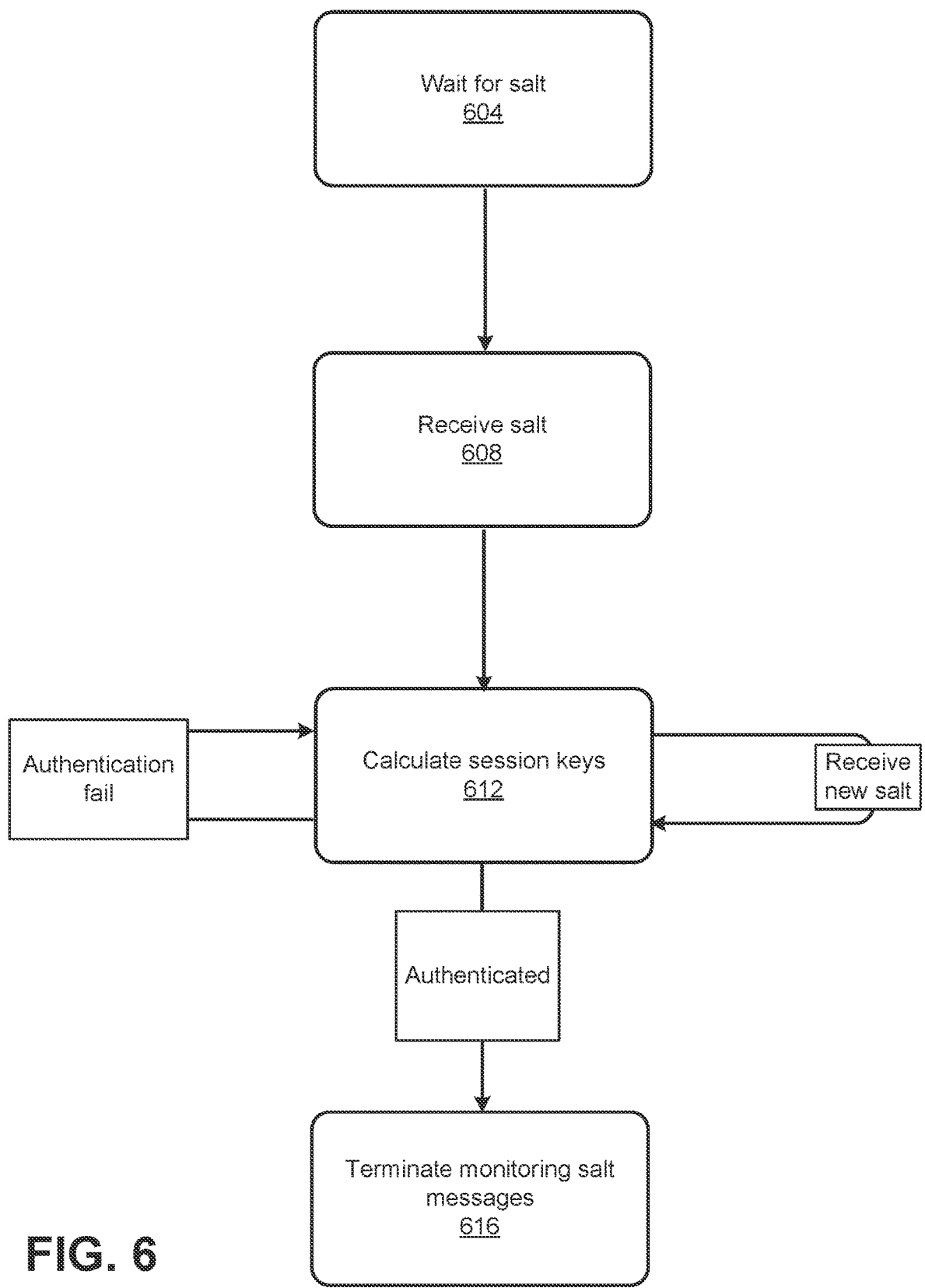
FIG. 6 is a flowchart illustrating a process for session key generation for AV operation, in accordance with at least one embodiment.

FIG. 6 is a flowchart illustrating an example process for session key generation for AV operation, in accordance with at least one embodiment. At least one AV operated using the process is the same as or similar to the AV 100 illustrated and described in more detail with reference to FIG. 1. In an embodiment, the process of FIG. 6 is performed by a vehicle service subscriber system in a group of vehicle service subscriber systems. The vehicle service subscriber system is the same as or similar to the AV service subscriber system 708. The vehicle service subscriber system is implemented using at least one processor (e.g., processor 304).

Other entities, for example, a server (e.g., server 136), a computer system (e.g., computer system 300), a mobile device, or an AV system (e.g., AV system 120) perform some or all of the elements of the process in other embodiments. It will be recognized that the technique of FIG. 6 is intended as an example technique, and other embodiments include more or fewer elements, elements in a different order than depicted, etc.

In an embodiment, a maximum number of vehicle service subscriber systems allowed to join a service session administered by a vehicle service provider system is limited to a threshold number of vehicle service subscriber systems specified by the vehicle service provider system. For example, a size of a group of vehicle service subscriber systems in a service session with a vehicle service provider system is limited to 10, 25, 50, 100, etc. The threshold number of vehicle service subscriber systems specified by the vehicle service provider system provides improved communication latencies, reduced amounts of data transmitted, and reduced computation load especially when a vehicle service provider system is computing new salts from entropies contributed by several different vehicle service subscriber systems in the group of vehicle service subscriber systems.

At startup, when a vehicle service subscriber system joins a session with a vehicle service provider system, the vehicle service subscriber system waits (604) to receive a salt message and a salt from the vehicle service provider system. The vehicle service provider system is the same as or similar to the AV service provider system 704, and is implemented using at least one processor such as processor 304.

The salt will eventually be used to calculate session keys for the session by the vehicle service subscriber system, such that the vehicle service subscriber system can authenticate and decode (or decrypt) black channel messages from the vehicle service provider system for the purpose of providing a ride to a passenger in an AV provided by the vehicle service provider system. The vehicle service provider system broadcasts the next salt message containing a salt as illustrated and described in more detail with reference to element 500 in FIG. 5. The vehicle service subscriber system receives (608) the broadcast salt in the salt message from the vehicle service provider system.

The vehicle service subscriber system calculates (612) the session keys for the session using the IKM and salt similar to the element 504 performed by the vehicle service provider system as illustrated and described in more detail with reference to FIG. 5. The vehicle service subscriber system uses the session keys to initialize its protected message (e.g., black channel) receiver. A black channel receiver is a part of a vehicle service subscriber system and is implemented using the components of the example computer system 300. The black channel receiver is used to receive black channel messages from a vehicle service provider system for the purpose of arranging a ride in an AV supplied by the vehicle service provider system. The vehicle service provider system broadcasts at least one black channel message to the group of vehicle service subscriber systems.

To verify that the salt and session keys are correct and were correctly received and generated/calculated, the vehicle service subscriber system attempts to authenticate the black channel message using the session keys. If the authentication of the black channel message using the session keys succeeds, the vehicle service subscriber system has the correct session keys. The vehicle service subscriber system consumes the black channel message and ignores future salt messages it receives during the session. The vehicle service subscriber system thus terminates (616) monitoring salt messages. On the other hand, if the authentication of the black channel message using the session keys fails, the vehicle service subscriber system drops the black channel message.

To authenticate a black channel message, a vehicle service subscriber system verifies a data origin of the black channel message and that the black channel message has not been modified while in transit. In an embodiment, a vehicle service subscriber system uses MACs, authenticated encryption (AE), or digital signatures to perform authentication. A MAC or digital authenticator is used as an integrity check based on the salt. The MAC is based on using a cryptographic hash or symmetric encryption.

On receiving a new black channel message, the vehicle service subscriber system again verifies that the salt and session keys are correct by attempting to authenticate the new black channel message using the session keys. If the black channel message authentication fails but the vehicle service subscriber system receives a new salt message having a different salt, the vehicle service subscriber system calculates (612) new session keys for the session using the IKM and new salt similar to the element 504 used by the vehicle service provider system, as illustrated and described in more detail with reference to FIG. 5. To verify that the new salt and new session keys are correct, the vehicle service subscriber system attempts to authenticate at least one black channel message using the new session keys.

If the authentication of the black channel message using the new session keys succeeds, the vehicle service subscriber system has the correct session keys for the session. The vehicle service subscriber system consumes the black channel message and ignores future salt messages it receives during the session. The vehicle service subscriber system thus terminates (616) monitoring further salt messages. The salt remains unchanged through the lifetime of the session, hence the vehicle service subscriber system stops monitoring salt messages after successfully authenticating a black channel protected message. The vehicle service subscriber system does not become desynchronized from the vehicle service provider system and authenticates black channel messages from the vehicle service provider system using the same session keys for the duration of the session.

Figure 7:
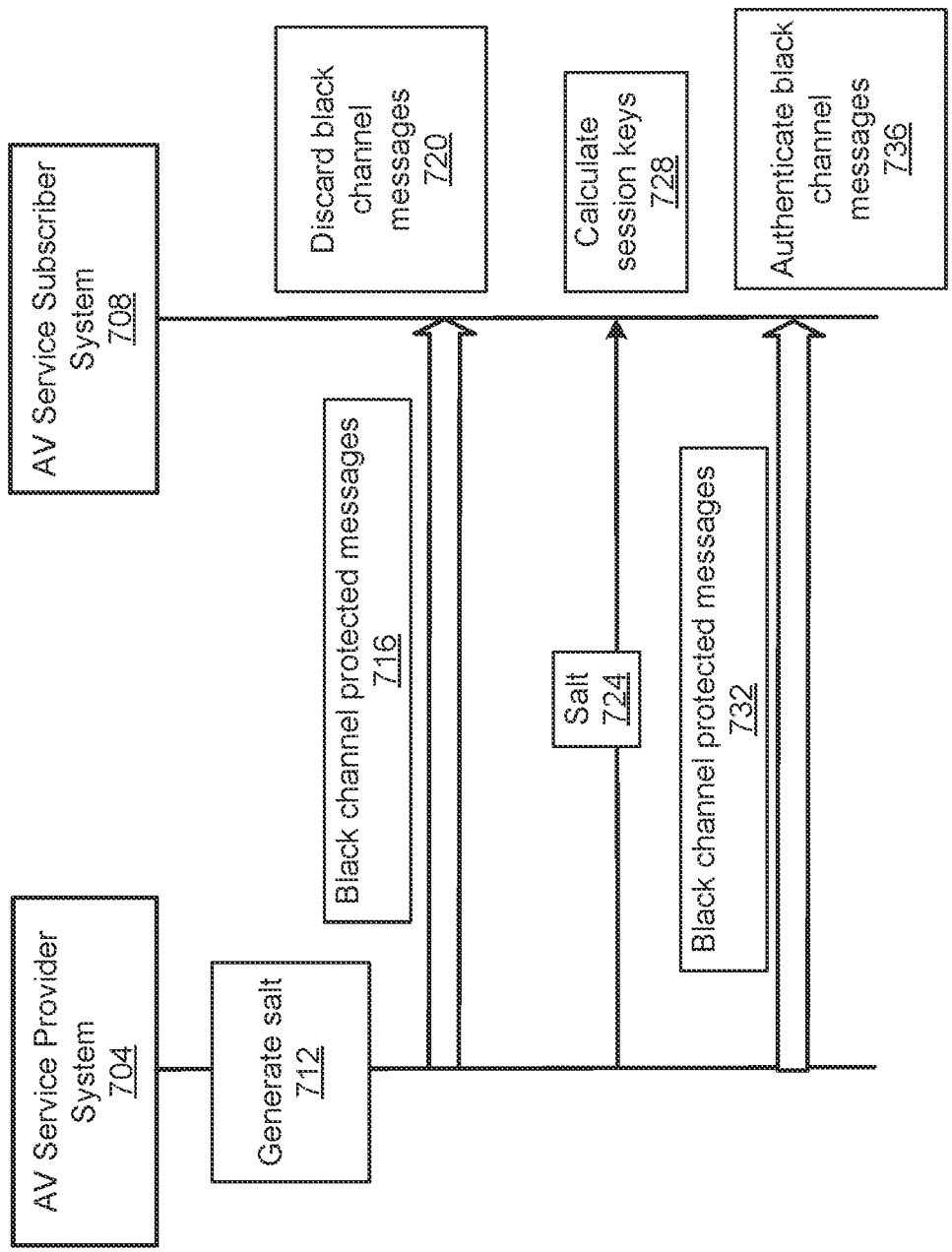
FIG. 7 is a timing diagram illustrating a process for session key generation for AV operation, in accordance with at least one embodiment.

FIG. 7 is a timing diagram illustrating an example process for session key generation and authentication for AV operation, in accordance with at least one embodiment. At least one AV operated using the process is the same as or similar to the AV. In an embodiment, the process of FIG. 7 is performed by an AV service provider system 704 and an AV service subscriber system 708. The AV service provider system 704 is described in more detail with reference to FIG. 5. The AV service provider system 704 is implemented using at least one processor, for example, the example processor 304.

The AV service subscriber system 708 is one of a group of vehicle service subscriber systems and is described in more detail with reference to FIG. 5. The AV service subscriber system 708 is implemented using at least one processor. The processor is the same as or similar to the processor 304 illustrated and described in more detail with reference to FIG. 3. Other entities, for example, a server (e.g., server 136), a computer system (e.g., computer system 300), a mobile device, or an AV system (e.g., AV system 120) perform some or all of the elements of the process in other embodiments. As described above, other embodiments include more, fewer, or different elements, or elements performed in a different order than depicted.

In element 712, the AV service provider system 704 generates a salt. For example, the AV service provider system 704 selects the salt from a pool of entropy values as illustrated and described in more detail with reference to FIG. 5. The AV service provider system 704 calculates session keys by an HKDF using an IKM and the salt as illustrated and described in more detail with reference to FIG. 5. The session keys can be adjusted based on the hashing algorithms used and the implementation of the hashing algorithms. The AV service provider system 704 initializes its black channel transmitter using the session keys, and broadcasts (716) at least one black channel message to the group of vehicle service subscriber systems.

In element 720, the AV service subscriber system 708 receives the black channel message but determines that it has not yet received a salt or calculated session keys for the session. The AV service subscriber system 708 drops the black channel message and does not attempt to authenticate the black channel message. The AV service subscriber system 708 continues to wait for a salt message from the vehicle service provider system as illustrated and described in more detail with reference to element 604 in FIG. 6. In element 724, the AV service provider system 704 broadcasts a salt message to the group of vehicle service subscriber systems containing the salt that was generated previously in element 712. The AV service subscriber system 708 receives the salt. Salt messages are broadcast by the AV service provider system 704 periodically to allow late and re-spawned vehicle service subscriber systems to synchronize with the AV service provider system 704.

In element 728, the AV service subscriber system 708 calculates the session keys using the salt and the IKM similar to the process performed by the AV service provider system 704 in element 712. The AV service provider system 704 broadcasts (732) a new black channel message to the group of vehicle service subscriber systems, which is received by the AV service subscriber system 708. The AV service subscriber system 708 uses the calculated session keys to authenticate (736) the new black channel message, and stops monitoring further salt messages. Subsequent black channel messages are decoded or decrypted by the AV service subscriber system 708 using the session keys to provide a ride to a passenger in an AV provided by the AV service provider system 704.

The frequency of salt message broadcast is adjusted according to at least one consideration. In an embodiment, a first frequency of transmission of the black channel messages by the AV service provider system 704 is greater than or equal to a second frequency of transmission of the salt messages. The frequency at which salt messages are broadcast determines the delay a vehicle service subscriber system experiences at startup. Hence, a higher frequency of broadcast of salt messages is desirable and is balanced against network overhead. Moreover, in a first implementation, there will be more black channel protected messages than salt messages. However, in a second implementation, there could be more salt messages than black channel messages. A vehicle service subscriber system successfully authenticates at least one black channel protected message to confirm that it has correctly calculated the session keys. Hence, a minimum ratio of black channel protected messages to salt messages should be at least 1:1 to allow the authentication check to occur promptly.

Figure 8:
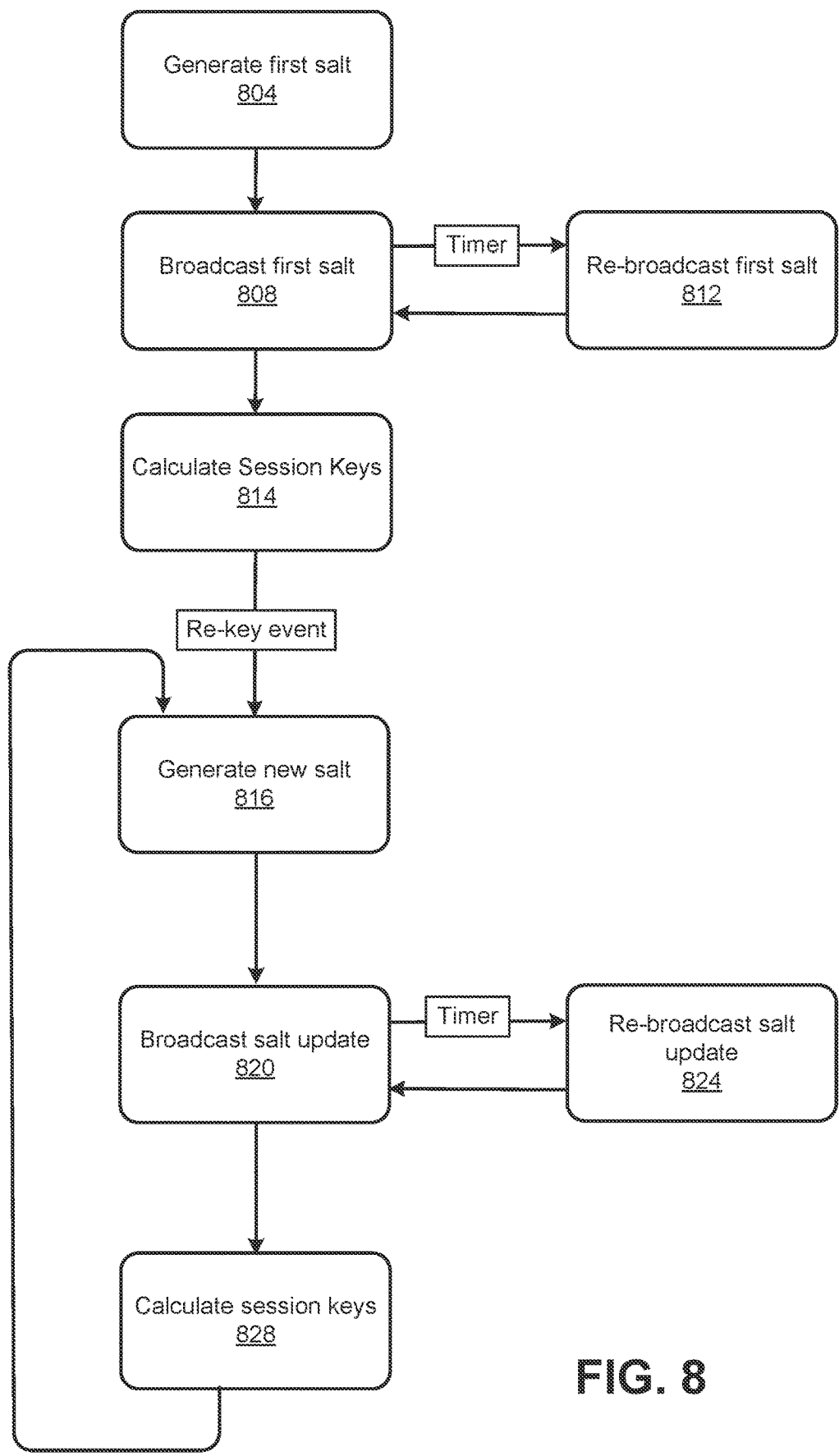
FIG. 8 is a flowchart illustrating a process for session key generation for AV operation, in accordance with at least one embodiment.

FIG. 8 is a flowchart illustrating an example process for session key generation for AV operation, in accordance with at least one embodiment. At least one AV operated using the process is the same as or similar to the AV 100 illustrated and described in more detail with reference to FIG. 1. In an embodiment, the process of FIG. 8 is performed by a vehicle service provider system. The vehicle service provider system is the same as or similar to the AV service provider system 704. Other entities, for example, a server (e.g., server 136) or a computer system (e.g., computer system 300) perform some or all of the elements of the process in other embodiments. Likewise, embodiments may include different, fewer, or additional elements, or perform the elements in different orders.

In element 804, a vehicle service provider system generates a first salt for encryption of session keys for a communication session with at least one vehicle service subscriber system. In an embodiment, the vehicle service subscriber system is the same as or similar to the AV service subscriber system 708. The vehicle service subscriber system is implemented using at least one processor, for example, the example processor 304. Other entities, for example, a mobile device or an AV system perform some or all of the elements of the process in other embodiments. The AV system is the same as or similar to the AV system 120. Likewise, embodiments may include different and/or additional elements, or perform the elements in different orders.

In an embodiment, the vehicle service provider system selects the first salt from an entropy pool, and calculates one or more session keys using the first salt. The vehicle service provider system initializes its black channel transmitter using the session keys, such that it is ready to transmit black channel messages to a group of vehicle service subscriber systems for the purpose of scheduling and providing a ride in AVs to users of the vehicle service subscriber systems. The vehicle service provider system then broadcasts black channel protected messages to the vehicle service subscriber systems.

Periodically, a salt message that contains the first salt, generated or selected at startup, is broadcast (808). For example, the vehicle service provider system uses a timer to periodically re-broadcast (812) the first salt. In an embodiment, the timer is an electronic timer, such as a quartz timer having digital electronics, an integrated circuit timer, a software timer, or a PLC having ladder logic. The vehicle service provider system may additionally calculate (814) session keys, for example in a manner similar to that described above with respect to element 504.

In an embodiment, a re-keying of the set of the vehicle service provider system and the group of vehicle service subscriber systems is triggered. For example, re-keying is triggered periodically or in response to an event within the system, e.g., a request by a vehicle service subscriber system for a new ride in an AV supplied by the vehicle service provider system or a start of a new ride in an AV. When a re-keying is needed, a vehicle service provider system generates (816) a new (second) salt, and thus corresponding second session keys, and notifies (820) the group of vehicle service subscriber systems of the change. When re-keying is performed, the black channel receivers of the group of vehicle service subscriber systems and the black channel transmitter of the vehicle service provider system are re-initialized with the second session keys and a black channel message sequence counter is reset to 0. The black channel receivers and the black channel transmitter remain synchronized, such that no black channel messages are dropped during the session key transition.

In an embodiment, a vehicle service provider system initiates re-keying of the session by sending a salt update message incorporating an entropy generated by the vehicle service provider system. For example, if a vehicle service subscriber system has not initiated re-keying or contributed entropy within a threshold amount of time, the vehicle service provider system initiates re-keying. The threshold amount of time is a few seconds to a few minutes. In an embodiment, the vehicle service provider system periodically initiates re-keying. The periodic re-keying interval is longer than the periodic salt message broadcast interval to prevent the group of vehicle service subscriber systems from being starved of opportunities to send synchronization messages. For example, the vehicle service provider system periodically initiates re-keying using a timer, such as a quartz timer having digital electronics, an integrated circuit timer, a software timer, or a PLC having ladder logic.

If a malicious entity attempts to force re-keying by submitting synchronization requests, the embodiments disclosed herein prevent this situation using a time interval between salt messages and salt update messages that can be adjusted. For example, after a salt update is broadcast, the vehicle service provider system increases a frequency of salt messages for a threshold period of time. The increase in the frequency of salt messages provides the group of vehicle service subscriber systems with an opportunity to re-synchronize with the vehicle service provider system. In an embodiment, the threshold period of time is a few seconds to a few minutes. In an embodiment, the vehicle service provider system broadcasts salt update messages at a higher frequency than salt messages. The increased frequency of the updates increases the number of re-transmissions of the salt update messages and reduces the number of vehicle service subscriber systems that fail to receive at least one update, thus enhancing security of the system.

In element 820, the vehicle service provider system broadcasts a salt update message including the second salt to the group of vehicle service subscriber systems. The salt update message is sometimes referred to as an "update." For example, the salt update message is represented as:

```
Salt Update Message
{
    valid through
    second salt
}
```

In an embodiment, the vehicle service provider system monitors a timer associated with a duration of broadcasting the first salt. For example, the duration of broadcasting the first salt is in a range of a few milliseconds to a few seconds. In an embodiment, the timer is an electronic timer, such as a quartz timer having digital electronics, an integrated circuit timer, a software timer, or a PLC having ladder logic. The update is broadcast to the group of vehicle service subscriber systems responsive to the timer expiring.

The salt update message has at least two fields. In an embodiment, the value of "valid through" is a sequence number of the last black channel protected message that is protected by the current session keys (derived from the first salt). The value of "second salt" is the new salt that will be used next. The value of the second salt can be adjusted using different hashing algorithms or a different implementation of the hashing function. In an embodiment, the value of "valid through" is a particular time until when incoming black channel protected messages will be protected by the current session keys (derived from the first salt).

In element 824, the vehicle service provider system re-broadcasts the salt update. When a salt update is to be scheduled, the vehicle service provider system selects (820) a suitable value for "valid through" and draws (816) a new salt from its entropy pool. The vehicle service provider system starts periodically re-broadcasting (824) the salt update messages instead of salt messages. For example, a timer is used to periodically re-broadcast the salt update messages as shown in FIG. 8. In an embodiment, the timer is an electronic timer, such as a quartz timer having digital electronics, an integrated circuit timer, a software timer, or a PLC having ladder logic.

At the selected time when "valid through" expires, the vehicle service provider system calculates (828) second (new) session keys, and returns to 816. In this manner, a seamless transition to new session keys without dropping messages is enabled.

In an embodiments where a new vehicle service subscriber system joins a group of vehicle service subscriber systems, for example, to request a new ride, the new vehicle service subscriber system waits in case an update has been scheduled to be broadcast (820). For example, the new vehicle service subscriber system waits for the update at 820 or 824 to complete and the new salt to become valid. Then, the new vehicle service subscriber system uses the new salt to calculate (828) session keys and attempts to authenticate a black channel protected message to confirm that the calculated session keys are correct. In an embodiment, the value of "valid through" is adjusted, such that a slower-reacting vehicle service subscriber system has sufficient time to process the salt update message and calculate new session keys before the update occurs.

Figure 9:
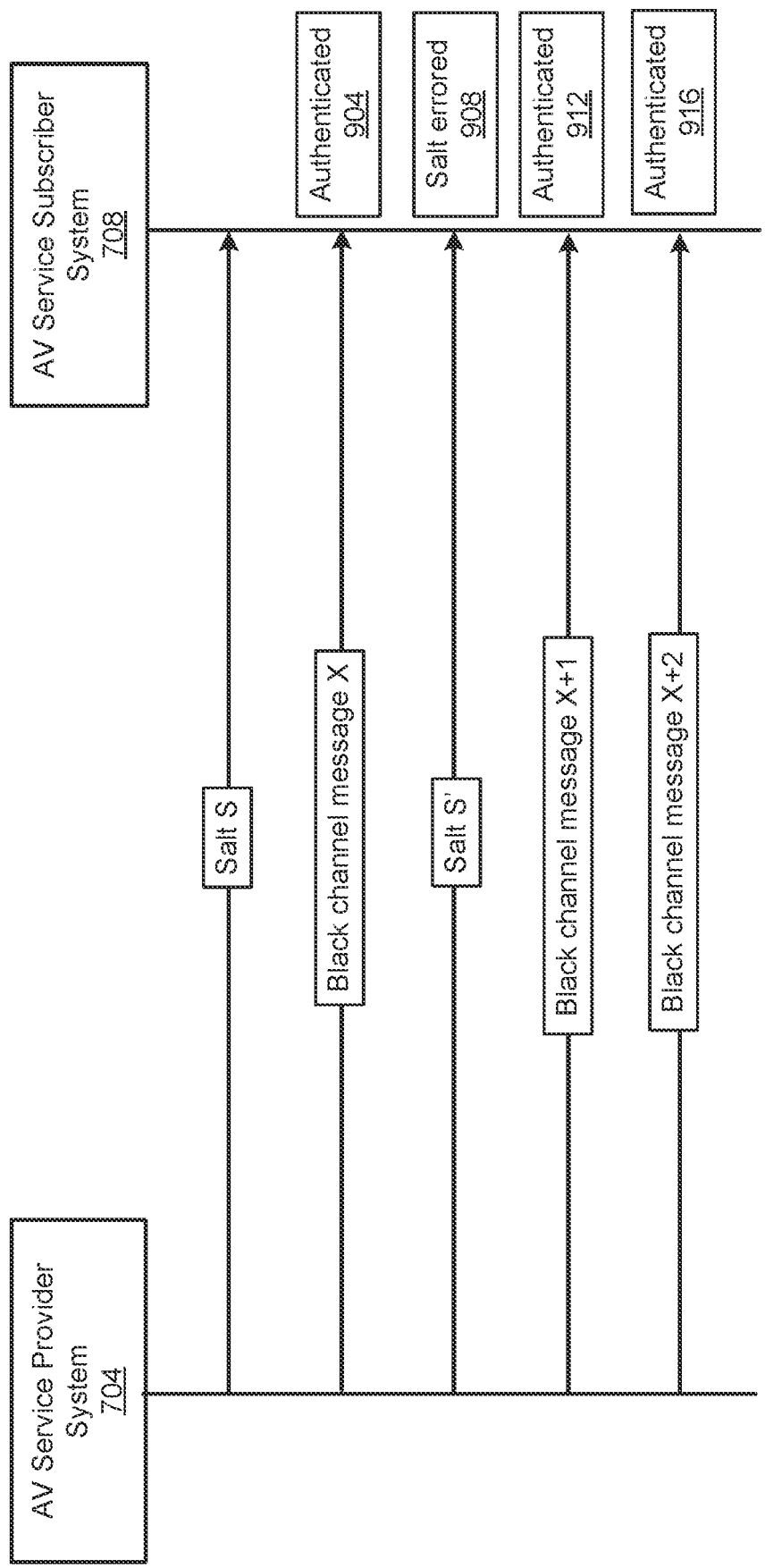
FIG. 9 is a timing diagram illustrating a process for session key generation for AV operation, in accordance with at least one embodiment.

FIG. 9 is a timing diagram illustrating an example process for session key generation for AV operation, in accordance with at least one embodiment. At least one AV operated using the process is the same as or similar to the AV 100. In an embodiment, the process of FIG. 9 is performed by an AV service provider system 704 implemented using at least one processor, for example, processor 304.

The AV service subscriber system 708 is one of a group of vehicle service subscriber systems as described herein, and is implemented using at least one processor such as processor 304 Other entities, for example, a server (e.g., server 136), a computer system (e.g., computer system 300), a mobile device, or an AV system (e.g., AV system 120) perform some or all of the elements of the process in other embodiments. Additionally, embodiments may include different, more, or fewer elements than depicted, or elements that occur in different orders than depicted.

The AV service provider system 704 generates a first salt, S. For example, the AV service provider system 704 generates the first salt, S, as a vector of pseudorandom values or selects the first salt, S, from a pool of entropy values as illustrated and described in more detail with reference to FIG. 5. The AV service provider system 704 calculates session keys by an HKDF using an IKM and the first salt, S, as illustrated and described in more detail with reference to FIG. 5. The AV service provider system 704 initializes its black channel transmitter using the session keys and broadcasts the first salt, S, in a salt message to the group of vehicle service subscriber systems. The AV service subscriber system 708 receives the first salt, S, and calculates session keys from the first salt, S, in a manner similar to the manner used by the AV service provider system 704. The AV service subscriber system 708 initializes its black channel receiver using the session keys.

The AV service provider system 704 broadcasts a black channel message, X, using its black channel transmitter to the group of vehicle service subscriber systems. The AV service subscriber system 708 receives the black channel message, X, using its black channel receiver. To determine whether it has the correct salt and session keys, the AV service subscriber system 708 attempts to authenticate the black channel message, X, in element 904 using the session keys. The black channel message, X, is authenticated correctly. To provide additional security, the embodiments disclosed herein are designed such that at least one salt update message is broadcast by the AV service provider system 704 between changes of salt. To signal a potential cyberattack, an error condition is triggered when a vehicle service subscriber system receives two sequential salt messages having different contents with no intervening salt update message. For example, in element 908, the AV service subscriber system 708 receives a salt message having a second salt, S', from the AV service provider system 704. Because there was no update between element 904 and element 908, an error is signaled and the second salt, S', is ignored.

To determine the cause of the error condition, the AV service subscriber system 708 checks further black channel protected messages received from the AV service provider system 704 in element 912. The AV service provider system 704 broadcasts the black channel message, X+1, which is received by the AV service subscriber system 708. In element 912, the black channel message, X+1, is correctly authenticated by the AV service subscriber system 708 using the session keys derived from the first salt, S. Next, the AV service provider system 704 broadcasts the black channel message, X+2, which is received by the AV service subscriber system 708. In element 916, the black channel message, X+2, is correctly authenticated by the AV service subscriber system 708 using the session keys derived from the first salt, S. Because the black channel messages, X+1 and X+2, continue to authenticate correctly, the erroneous second salt, S', is discarded. The AV service subscriber system 708 transmits a message or warning to the AV service provider system 704 or a central server informing the AV service provider system 704 or central server of the erroneous second salt, S', and warning of a potential tampered salt or a potential replay attack by a malicious entity.

Figure 10:
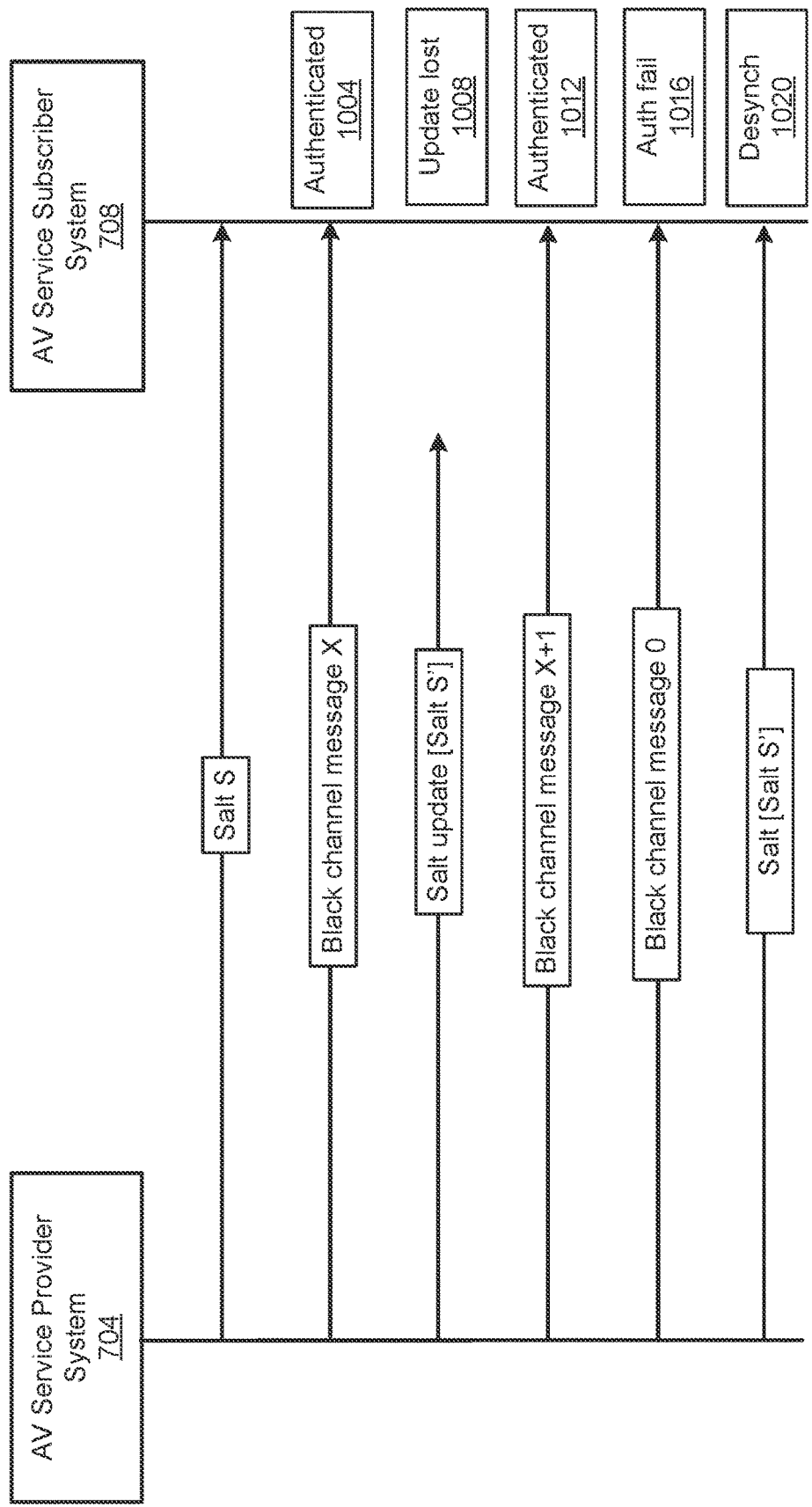
FIG. 10 is a timing diagram illustrating a process for session key generation for AV operation, in accordance with at least one embodiment.

FIG. 10 is a timing diagram illustrating an example process for session key generation for AV operation, in accordance with at least one embodiment. At least one AV operated using the process is the same as or similar to the AV 100. In an embodiment, the process of FIG. 10 is performed by an AV service provider system 704 and an AV service subscriber system 708, as described above. In an embodiment, the AV service provider system 704 is implemented using at least one processor, for example, the example processor 304.

The AV service subscriber system 708 is one of a group of vehicle service subscriber systems as described above, and is implemented using at least one processor such as processor 304. Other entities, for example, a server (e.g., server 136), a computer system (e.g., computer system 300), a mobile device, or an AV system (e.g., AV system 120) perform some or all of the elements of the process in other embodiments. Additionally, other embodiments include more, fewer, or different elements, elements performed in a different order than depicted, etc.

The AV service provider system 704 generates a first salt, S. For example, the AV service provider system 704 selects the first salt, S, from a pool of entropy values as illustrated and described in more detail with reference to FIG. 5. The AV service provider system 704 calculates session keys by an HKDF using an IKM and the first salt, S, as illustrated and described in more detail with reference to FIG. 5. The AV service provider system 704 initializes its black channel transmitter using the session keys and broadcasts the first salt, S, in a salt message to the group of vehicle service subscriber systems. The AV service subscriber system 708 receives the first salt, S, and calculates session keys from the first salt, S, in a manner similar to the manner used by the AV service provider system 704. The AV service subscriber system 708 initializes its black channel receiver using the session keys.

The AV service provider system 704 broadcasts a first black channel message, X, using its black channel transmitter to the group of vehicle service subscriber systems. The AV service subscriber system 708 receives the first black channel message, X, using its black channel receiver. To determine whether it has the correct salt and session keys, the AV service subscriber system 708 attempts to authenticate the first black channel message, X, in element 1004 using the session keys. The first black channel message, X, is authenticated correctly.

In an embodiment, the AV service subscriber system 708 receives a second salt, S', from the AV service provider system 704. The salt message including the second salt, S', indicates an absence of a scheduled salt update associated with the second salt, S'. The AV service subscriber system 708 transmits a replay warning message to the AV service provider system 704 indicating a possible replay attack. For example, the AV service provider system 704 broadcasts an update having the second salt, S', to the group of vehicle service subscriber systems. However, in element 1008, the AV service subscriber system 708 misses receiving the update either due to a malfunction in the network, a power outage, another reason the packets are dropped, or a combination thereof.

The AV service provider system 704 uses its black channel transmitter to broadcast a second black channel message, X+1, to the group of vehicle service subscriber systems. The AV service subscriber system 708 receives the second black channel message, X+1, using its black channel receiver. The AV service subscriber system 708 successfully authenticates the second black channel message, X+1, in element 1012 using the session keys based on the first salt, S (because the AV service subscriber system 708 is unaware there has been a salt update). In an embodiment, the AV service provider system 704 monitors a timer associated with a duration of broadcasting the update. After the timer expires, a black channel message sequence counter is set to 0 and the AV service provider system 704 broadcasts the next black channel message, 0. To decrypt the black channel message, 0, new session keys generated using the second salt, S', are needed. However, the AV service subscriber system 708 is still using the previous set of session keys calculated using the first salt, S.

The AV service subscriber system 708 receives the black channel message, 0, using its black channel receiver. In element 1016, the AV service subscriber system 708 attempts to authenticate the black channel message, 0, using session keys calculated from the first salt, S'. The authentication fails. In an embodiment, the AV service provider system 704 monitors a timer associated with a duration of broadcasting the update. A salt message having the second salt, S, is broadcast by the AV service provider system 704 responsive to the timer expiring. Because the AV service subscriber system 708 receives the second salt, S', after receiving the first salt, S, without receiving an intervening update, the AV service subscriber system 708 is desynchronized from the AV service provider system 704 at 1020. The AV service provider system 704 transmits a replay warning message to the AV service provider system 704 indicating a possible replay attack. Therefore, when there is a dropped or lost salt update message as in element 1008, the black channel protected messages no longer authenticate correctly (element 1016). The AV service subscriber system 708 is required to re-synchronize with the AV service provider system 704.

Figure 11:
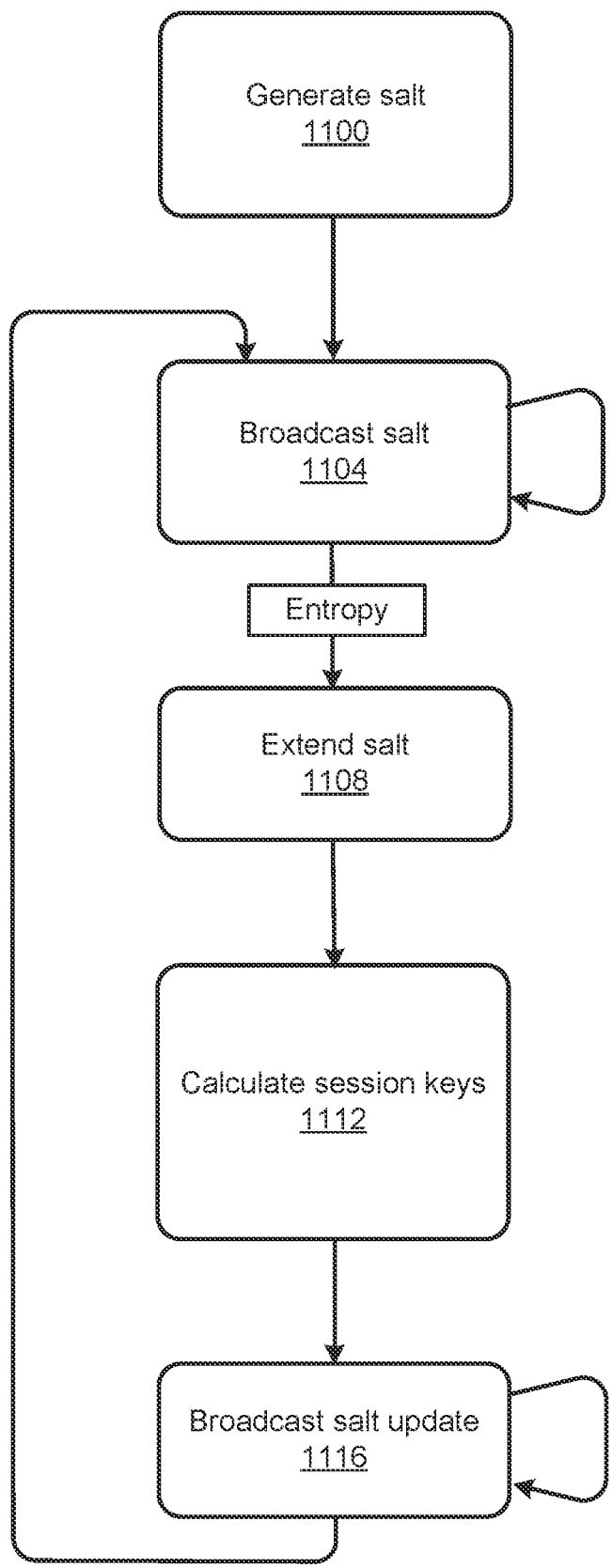
FIG. 11 is a flowchart illustrating a process for session key generation for AV operation, in accordance with at least one embodiment.

FIG. 11 is a flowchart illustrating an example process for session key generation for AV operation, in accordance with at least one embodiment. At least one AV operated using the process is the same as or similar to the AV 100. In an embodiment, the process of FIG. 11 is performed by a vehicle service provider system, which is the same as or similar to the AV service provider system 704. Other entities, for example, a server (e.g., server 136) or a computer system (e.g., computer system 300) perform some or all of the elements of the process in other embodiments. It will be understood that other embodiments include more, fewer, or different elements, or elements in a different order than depicted herein.

In element 1100, a vehicle service provider system (e.g., AV service subscriber system 708 that is implemented using at least one processor such as processor 304) generates a first salt for encryption of session keys for a communication session with at least one vehicle service subscriber system. The vehicle service subscriber system is one of a group of vehicle service subscriber systems. Other entities, for example, a mobile device or an AV system (e.g., AV system 120) perform some or all of the elements of the process in other embodiments.

In an embodiment, the vehicle service provider system selects the first salt from an entropy pool. The vehicle service provider system calculates session keys using the first salt. The vehicle service provider system initializes its black channel transmitter using the session keys, such that it is ready to transmit black channel messages to a group of vehicle service subscriber systems for the purpose of scheduling and providing rides in AVs to users of the vehicle service subscriber systems.

In an embodiment, the vehicle service provider system broadcasts the first salt to at least one vehicle service subscriber system associated with a vehicle service subscriber. The vehicle service subscriber is a user of the vehicle service subscriber system or a software client running on the vehicle service subscriber system. The vehicle service provider system is associated with at least one vehicle, for example, the AV 100. The vehicle service provider system starts a timer associated with a duration of broadcasting the first salt within a salt message to the group of vehicle service subscriber systems. In response to the timer expiring, the vehicle service provider system broadcasts (1104) a salt message containing the first salt generated or selected at startup. The timer associated with a duration of broadcasting the first salt is reset, and the vehicle service provider system re-broadcasts (1104) a salt message containing the first salt periodically as the timer expires. For example, the timer is an electronic timer, such as a quartz timer having digital electronics, an integrated circuit timer, a software timer, or a PLC having ladder logic.

The embodiments described herein use entropy generated by each vehicle service subscriber system in the group of vehicle service subscriber systems to update the salt to enhance the security benefits of the HKDF. Hence, susceptibility of the system to entropy weaknesses at the vehicle service provider system is obviated. The group of vehicle service subscriber systems is also prevented from vulnerability to replay attacks. The embodiments further prevent vulnerability of a vehicle service subscriber system before it authenticates its first black channel protected message and the session keys are "locked in," as well as when re-keying occurs. The entropy contributed by a vehicle service subscriber system is carried forward for the remainder of the session.

In an embodiment, the vehicle service provider system receives a synchronization message from a vehicle service subscriber system in the group of vehicle service subscriber systems. The synchronization message includes an entropy generated by the vehicle service subscriber system. The entropy is generated by the vehicle service subscriber system independently of the vehicle service provider system and independently of the different entropy pool of the vehicle service provider system. The entropy is a random value (integer or floating point), a pseudorandom value, a digital vector of randomly generated bits, or a combination thereof. The synchronization message is generated by the vehicle service subscriber system to contribute entropy to the next salt update. The synchronization message is represented as follows:

```
Synchronization Message
{
    entropy
    last salt
}
```

The entropy value is adjusted by the vehicle service subscriber system using different hashing algorithms and implementations of hashing. In an embodiment, the "entropy" field in the synchronization message is a random number drawn by a vehicle service subscriber system from its own entropy pool. The "last salt" refers to the salt value from the last salt message the vehicle service subscriber system received. For example, the "last salt" is the first salt generated by the vehicle service provider system in element 1100. In an embodiment, the vehicle service provider system enhances security by verifying that the synchronization message's "last salt" field is valid. To be valid, the synchronization message's "last salt" field value should match the vehicle service provider system's current salt (e.g., the first salt). If the verification is successful, the vehicle service provider system processes the synchronization message.

In an embodiment, the vehicle service provider system determines that a result of hash-based message authentication performed on the first salt mismatches the "last salt" received from the vehicle service subscriber system in the synchronization message. In response to determining that the result mismatches the "last salt," the vehicle service provider system determines an indication of a possible denial-of-service (DoS) attack. For example, to prevent a malicious entity from flooding the group of vehicle service subscriber system with synchronization messages and triggering a large number of session key recalculations, thus resulting in a DoS attack against central processing unit (CPU) availability at the vehicle service provider system and group of vehicle service subscriber system, the contents of the "last salt" field are adjusted as in equation (2):

$$\text{last salt} = \text{HMAC}[K_{ss}, \text{current salt} \| \text{entropy}] \quad (2)$$

Here, $K_{ss}$ denotes a cryptographic session key that is determined by the vehicle service provider system (using an optimistic, look-ahead heuristic) as if the current salt (e.g., the first salt generated by the vehicle service provider system) were trusted. Hence, the key $K_{ss}$ is determined using equation (3):

$$K_{ss} = \text{HKDF}(\text{salt}, IKM)^* \quad (3)$$

When the vehicle service provider system receives the synchronization message, the vehicle service provider system uses the entropy supplied by the vehicle service subscriber system and the vehicle service provider system's copy of the current salt (e.g., the first salt) to perform the same HMAC determination as the vehicle service subscriber system. The vehicle service provider system compares the results of the HMAC to the "last salt" received from the vehicle service subscriber system. If the verification check is successful, the vehicle service provider system moves to element 1108. If the verification check fails, the vehicle service provider system drops the synchronization message and signals a potential DoS attack or irregularity. In an embodiment, if there is a key reuse issue, a different IKM is used to avoid key duplication.

In an embodiment, the vehicle service provider system generates a second salt based on the first salt and the entropy received from the vehicle service subscriber system. For example, the vehicle service provider system extends (1108) the first salt by concatenating the current salt (e.g., the first salt) and the entropy from the received synchronization message. In an embodiment, generating the second salt includes performing, by the vehicle service provider system, an HMAC on a concatenation of the first salt and the entropy. For example, the concatenated data is passed through a hashing algorithm to produce the value of the second salt. For example, the second salt is generated as in equation (4):

$$\text{second salt} = \text{Hash}[\text{current salt} \| \text{entropy}] \quad (4)$$

In an embodiment, information identifying the vehicle service provider system, such as a name, identification number, or IP address, is included in the concatenated data to enhance data security.

The vehicle service provider system calculates (1112) session keys based on the second salt. In an embodiment, the session keys are calculated using an HKDF, an IKM and the second salt as illustrated and described in more detail with reference to FIG. 5. For example, the session keys are determined using an HKDF based on an HMAC. In an embodiment, the vehicle service provider system sets a timer after receiving the synchronization message and the second salt is generated by the vehicle service provider system when the timer expires. When the second salt is generated, the vehicle service provider system re-initializes its black channel transmitter context with the session keys derived from the second salt. In an embodiment to improve security further, prior to generating the session keys, the vehicle service provider system verifies that hash-based message authentication performed on a concatenation of the "last salt" from the vehicle service subscriber system and the entropy matches the second salt. In response to the verification failing, the vehicle service provider system signals a potential DoS attack or irregularity.

The vehicle service provider system broadcasts (1116) an update to the group of vehicle service subscriber systems. The update includes the second salt for decrypting black channel messages using the session keys. The black channel messages are for providing a ride in at least one vehicle associated with the vehicle service provider system. In an embodiment, the vehicle service provider system broadcasts an extended salt update message. The salt update message is extended to accommodate at least one entropy contribution received as part of the synchronization messages from the group of vehicle service subscriber systems. For example, the extended update is represented as follows:

```
Salt Update Message
{
    second salt
    entropy
}
```

The "entropy" field in the extended update denotes the entropy contributed by at least one vehicle service subscriber system. In an embodiment, security is further improved by enhancing the salt generation to prevent an attacker fabricating a salt update message and potentially causing a DoS attack against the group of vehicle service subscriber systems. The salt generation is enhanced by substituting the cryptographic hash with an HMAC to prevent attackers from forging salt update messages. The enhanced salt generation is performed as in equation (5):

$$\text{second salt} = \text{HMAC}[K_{ns}, \text{current salt} \| \text{entropy}] \quad (5)$$

The key, $K_{ns}$, is determined as if the current salt (e.g., the first salt) were trusted. Hence, the key, $K_{ns}$, is determined using equation (6):

$$K_{ns} = \text{HKDF}(\text{Salt}, IKM) \quad (6)$$

In an embodiment, key reuse issues are avoided by the use of different IKMs.

The vehicle service provider system periodically re-broadcasts (1116) the salt update message. For example, a timer is used to periodically re-broadcast the salt update message as illustrated and described in more detail with reference to FIG. 8. In an embodiment, the salt update message is broadcast (1116) and repeated a maximum number N times at intervals controlled by the timer. In an embodiment, the timer is an electronic timer, such as a quartz timer having digital electronics, an integrated circuit timer, a software timer, or a PLC having ladder logic. The vehicle service provider system returns to element 1104 to broadcast the second salt to the group of vehicle service subscriber systems for providing a ride in at least one vehicle associated with the vehicle service provider system.

In an embodiment, the vehicle service provider system encrypts black channel messages using the session keys it calculated. The vehicle service provider system transmits the black channel messages to at least one vehicle service subscriber system in the group of vehicle service subscriber systems as illustrated and described in more detail with reference to FIG. 7. In an embodiment, the black channel protects any black channel messages that are broadcast after the second salt is generated (1108) using the new session keys.

In an embodiment, the entropy described is a first entropy generated by a first vehicle service subscriber system of the group of vehicle service subscriber systems. The first vehicle service subscriber system is associated with a first ride in a first vehicle associated with the vehicle service provider system. The update broadcast (1116) by the vehicle service provider system is a first update to the first salt, resulting in the second salt. The vehicle service provider system receives a request from a second vehicle service subscriber system (of the group of vehicle service subscriber systems) for a second ride. In an embodiment, the second vehicle service subscriber system is a new entrant to the group of vehicle service subscriber systems. The vehicle service provider system generates (1108) a third salt based on the second salt and a second entropy generated by the second vehicle service subscriber system. The vehicle service provider system broadcasts (1116) a second update to the group of vehicle service subscriber systems, such that the second update includes the third salt.

In an embodiment, the second salt includes a hash of multiple entropy values. Each entropy value is received by the vehicle service provider system from a respective vehicle service subscriber system. For example, the first valid synchronization message that passes the verification checks described herein causes the vehicle service provider system to schedule a salt update. The entropy from any synchronization messages received from the group of vehicle service subscriber systems before the salt update is performed will be included in the new salt generation.

In an embodiment, when a vehicle service provider system receives a synchronization message and a salt update message has already been broadcast, the synchronization message is discarded. For example, the synchronization message received by the vehicle service provider system is a first synchronization message. The vehicle service provider system receives a second synchronization message after broadcasting (1116) the update but before broadcasting (1104) the new salt. In response, the vehicle service provider system discards the second synchronization message received just after broadcasting (1116) the update.

Figure 12:
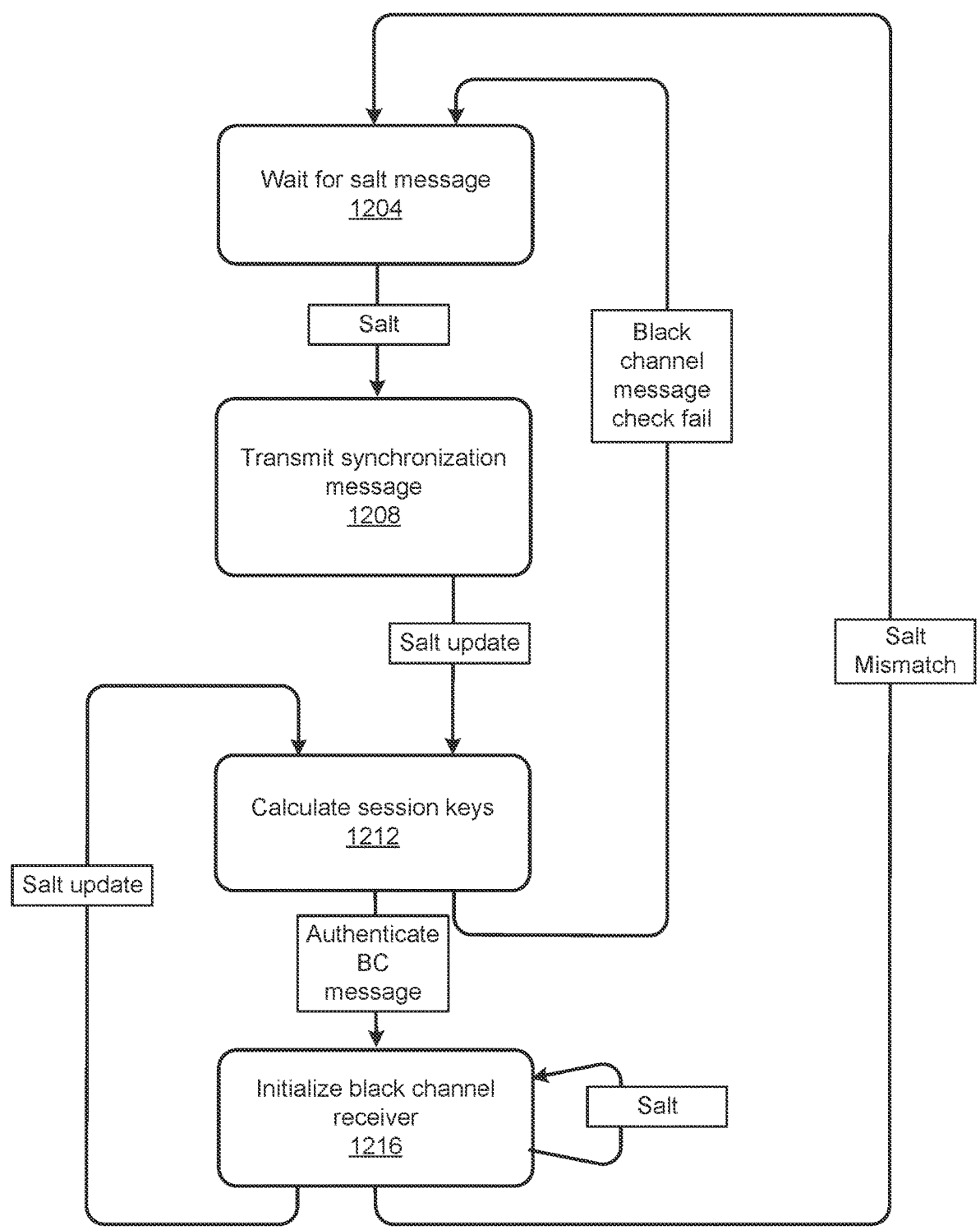
FIG. 12 is a flowchart illustrating a process for session key generation for AV operation, in accordance with at least one embodiment.

FIG. 12 is a flowchart illustrating an example process for session key generation for AV operation, in accordance with at least one embodiment. At least one AV operated using the process is the same as or similar to the AV 100 illustrated and described in more detail with reference to FIG. 1. In an embodiment, the process of FIG. 12 is performed by a vehicle service subscriber system (e.g., AV service subscriber system 708 that is implemented using at least one processor such as processor 304) in a group of vehicle service subscriber systems. Other entities, for example, a server (e.g., server 136), a computer system (e.g., computer system 300), a mobile device, or an AV system (e.g., AV system 120) perform some or all of the elements of the process in other embodiments. Additionally, other embodiments of the technique include more or fewer elements, different elements, elements performed in a different order than depicted, etc.

At startup, when a vehicle service subscriber system joins a session with a vehicle service provider system (e.g., AV service provider system 704 implemented using at least one processor such as processor 304), the vehicle service subscriber system waits (1204) to receive a salt message and a salt from the vehicle service provider system.

In an embodiment, at startup when a vehicle service subscriber system is attempting to coordinate with the vehicle service provider system to provide a ride to a user or passenger associated with the vehicle service subscriber system, the vehicle service subscriber system sends a notification to the vehicle service provider system requesting a new ride. The vehicle service subscriber system joins the session with the group of vehicle service subscriber systems and the vehicle service provider system. The vehicle service subscriber system receives the salt from the vehicle service provider system in response to transmitting a request to the vehicle service provider system for the ride in a vehicle associated with the vehicle service provider system. In an embodiment, the salt received from the vehicle service provider system includes or is pseudorandom data generated by the vehicle service provider system. For example, the pseudorandom data is selected by the vehicle service provider system from an entropy pool of the vehicle service provider system. The entropy pool of the vehicle service provider system is independent of entropy generated by the vehicle service subscriber system.

The salt will eventually be used to calculate session keys for the session by the vehicle service subscriber system, such that the vehicle service subscriber system can authenticate and decode (or decrypt) black channel messages from the vehicle service provider system for the purpose of providing a ride to a passenger in an AV associated with or provided by the vehicle service provider system. The vehicle service provider system broadcasts a salt message containing a salt as illustrated and described in more detail with reference to element 500 in FIG. 5. The vehicle service subscriber system receives the broadcast salt in the salt message from the vehicle service provider system.

The vehicle service subscriber system is associated with a vehicle service subscriber, which can be a user of a mobile device on which the vehicle service subscriber system is located, a software client of the vehicle service subscriber system, an app executing on the mobile device, or a software client running on an AV system of which the vehicle service subscriber system is a part. The vehicle service subscriber system generates an entropy. The entropy is generated by the vehicle service subscriber system independently of the vehicle service provider system and independently of the different entropy pool of the vehicle service provider system as illustrated and described in more detail with reference to FIG. 11. The entropy is a random value (integer or floating point), a pseudorandom value, a digital vector of randomly generated bits, or a combination thereof. In an embodiment, the vehicle service subscriber system selects the entropy from an entropy pool that is independent of the different entropy pool of the vehicle service provider system.

The vehicle service subscriber system transmits (1208) a synchronization message to the vehicle service provider system, which is associated with at least one vehicle. The synchronization message includes the entropy. In an embodiment, the vehicle service subscriber system receives a salt message indicating a lack of a scheduled salt update. Prior to the vehicle service subscriber system sending a synchronization message to the vehicle service provider system, in element 1204 the vehicle service subscriber system waits for at least one salt message to be broadcast by the vehicle service provider system. The salt message indicates that no salt update is currently scheduled. The vehicle service provider system discards any synchronization messages received after broadcast of a salt update has commenced. The vehicle service provider system periodically transmits a salt to the vehicle service subscriber system at regular intervals using a timer. The salt message is different from an update, which indicates a salt update is being performed by the vehicle service provider system. In an embodiment, the timer is an electronic timer, such as a quartz timer having digital electronics, an integrated circuit timer, a software timer, or a PLC having ladder logic. The vehicle service subscriber system transmits (1208) the synchronization message in response to receiving the salt message from the vehicle service provider system.

In response to receiving an update (a salt update message) containing a salt from the vehicle service provider system, the vehicle service subscriber system verifies that the salt was generated using the entropy that the vehicle service subscriber system contributed to the vehicle service provider system. In an embodiment, the salt is generated using an HMAC by the vehicle service provider system based on the entropy. The vehicle service subscriber system verifies that the salt is generated using an HMAC and the entropy that the vehicle service subscriber system generated and transmitted. For example, once the synchronization message has been sent in element 1208, the vehicle service subscriber system waits for a salt update message to be broadcast by the vehicle service provider system. If the vehicle service subscriber system's entropy contribution is listed, shown, or incorporated in the salt update message's entropy field and the vehicle service subscriber system verifies the determination of the new salt, the vehicle service subscriber system has successfully contributed its entropy to the salt. The vehicle service subscriber system then calculates session keys in element 1212 and begins authenticating black channel protected messages.

In an embodiment, the salt is generated by a cryptographic hash performed on a previous salt (received by the vehicle service subscriber system at element 1204) using the entropy. For example, the vehicle service provider system uses a hash function to take the entropy and generate the salt of a fixed-size including enciphered text. In an embodiment, if the vehicle service subscriber system determines that its entropy contribution is not listed or incorporated in the salt update message or if the salt verification fails, the vehicle service subscriber system retries the synchronization message element of element 1208. In an embodiment, the vehicle service subscriber system sends a warning message to the vehicle service provider system indicating a potential replay attack. The vehicle service subscriber system does not trust a broadcast salt until the vehicle service subscriber system's entropy contribution is incorporated by the vehicle service provider system into the salt. The vehicle service subscriber system attempts to verify this incorporation, and if the verification is successful, the salt is considered trusted by the vehicle service subscriber system. Only a trusted salt is used by the vehicle service subscriber system to calculate session keys for authenticating black channel protected messages from the vehicle service provider system.

In an embodiment, the vehicle service subscriber system receives the salt within an update from the vehicle service provider system. A first frequency of transmission of the salt message is greater than a second frequency of transmission of the update. For example, salt messages (different from update messages) are transmitted more frequently than update messages. In an embodiment, once a vehicle service subscriber system that has successfully completed the synchronization message procedure in element 1208 receives a salt update message indicating a salt update is scheduled, the vehicle service subscriber system verifies the salt determination. If the salt determination is verified successfully, the vehicle service subscriber system calculates (1212) and uses the new session keys. If verification fails, the vehicle service subscriber system retries the synchronization message procedure of element 1208.

In an embodiment, the vehicle service subscriber system determines that the salt received in the update message excludes the entropy. The vehicle service subscriber system waits (1204) for a salt message from the vehicle service provider system indicating a lack of a scheduled salt update. In response to receiving a salt message from the vehicle service provider system indicating a lack of a scheduled salt update, the vehicle service subscriber system re-transmits (1208) the synchronization message. In an embodiment, the vehicle service subscriber system determines that the salt excludes the entropy. In response, the vehicle service subscriber system transmits a message to the vehicle service provider system indicating a possible replay attack. In an embodiment, once a vehicle service subscriber system that has successfully completed the synchronization message procedure of element 1208 receives a salt message and the salt value does not match the vehicle service subscriber system's own records, the vehicle service subscriber system retries the synchronization message procedure of element 1208.

The embodiments disclosed herein therefore detect and prevent two types of attacks. Replay attacks are prevented in which a malicious entity intercepts a salt message or an update, imitates the vehicle service provider system, and sends messages to the vehicle service subscriber system pretending to be the vehicle service provider system. For example, a malicious entity may attempt replay attacks to extract personal, financial or confidential information, or payments from the vehicle service subscriber system. DoS attacks are prevented in which a malicious entity intercepts a salt message or an update, imitates the vehicle service subscriber system, and sends messages to the vehicle service provider system pretending to be the vehicle service subscriber system. A malicious entity may attempt a DoS attack to extract personal, financial or confidential information from the vehicle service provider system, implement denial-of-service, or attempt to hold the vehicle service provider system to ransom.

In element 1212, the vehicle service subscriber system calculates session keys using the salt. The session keys are calculated in a manner similar to or in the same manner as that described in more detail elsewhere herein. In an embodiment, the salt received by the vehicle service subscriber system from the vehicle service provider system in element 1208 is a first salt and the entropy generated by the vehicle service subscriber system and transmitted in element 1208 is a first entropy. The vehicle service subscriber system that generates the first entropy is a first vehicle service subscriber system of the group of vehicle service subscriber systems. The session keys calculated by the first vehicle service subscriber system in element 1212 are first session keys. The first vehicle service subscriber system receives an update in element 1216 from the vehicle service provider system. The update includes a second salt generated using a second entropy generated by a second vehicle service subscriber system of the group of vehicle service subscriber systems. For example, the vehicle service subscriber system is requesting an AV ride for a passenger in another vehicle associated with the vehicle service provider system. The first vehicle service subscriber system moves to element 1212 and calculates second session keys using the second salt. The second session keys are calculated using a process same as or similar to the process described in more detail with reference to FIG. 11.

In an embodiment, a black channel message received by a vehicle service subscriber system in element 1212 is a first black channel message. The vehicle service subscriber system determines that session keys calculated based on a salt that includes entropy from another vehicle service subscriber system fail to authenticate a second black channel message received from the vehicle service provider system. For example, there is a risk that the second vehicle service subscriber system is a malicious entity. The vehicle service subscriber system generates a replay warning message to the vehicle service provider system indicating a possible replay attack.

In an embodiment, the vehicle service subscriber system is one of a group of vehicle service subscriber systems. The salt includes a chained set of elements. Each element of the chained set is generated using a different entropy generated by a respective vehicle service subscriber system of the group of vehicle service subscriber systems. Thus each vehicle service subscriber system in the group of vehicle service subscriber systems enhances security for each other vehicle service subscriber system as well as for the vehicle service provider system. For example, further salt updates may occur in element 1208 that a particular vehicle service subscriber system did not directly contribute to. By verifying each link in the "salt-chain," the particular vehicle service subscriber system verifies that its entropy contribution is still present. The "salt-chain" is built using a series of cryptographic hashes. Thus, the salt value represents a history of the entropy contributed by vehicle service subscriber systems in the session. Even a large number of new vehicle service subscriber systems that enter the session with the vehicle service provider system does not "flush out" existing entropy contributions. If a vehicle service subscriber system detects that the "salt-chain" has been broken, the vehicle service subscriber system will consider any new salt untrusted until the vehicle service subscriber system has contributed more entropy and verifies that the entropy is incorporated by the vehicle service provider system into a salt.

The vehicle service subscriber system receives a black channel message from the vehicle service provider system. The vehicle service subscriber system authenticates the black channel message using the session keys for providing a ride in at least one vehicle associated with the vehicle service provider system. If the black channel message authentication fails, the vehicle service subscriber system moves to element 1204 in the process and waits for the next salt message. In an embodiment, the vehicle service subscriber system initializes a black channel receiver for receiving black channel messages from the vehicle service provider system in response to verifying that the salt was generated using the entropy. In element 1216, once the black channel message is authenticated and the salt is trusted, the vehicle service subscriber system initializes its black channel receiver to receive and decrypt further black channel messages associated with providing an AV ride.

In an embodiment, in element 1216 the vehicle service subscriber system receives a next update. The vehicle service subscriber system moves to element 1212 in the process and calculates session keys based on the next salt. The vehicle service subscriber system determines that the next update indicates that the current salt is valid until a particular time. For example, the "valid through" value is used as an indicator. The "valid through" indicator is described in more detail with reference to FIG. 8. The vehicle service subscriber system receives a next salt from the vehicle service provider system within the next update. The vehicle service subscriber system decrypts black channel messages based on the current salt. The black channel messages are for providing the ride in a vehicle associated with the vehicle service provider system.

In element 1216, the vehicle service subscriber system periodically receives salt messages containing the current salt from the vehicle service provider system. If one of these received salt values mismatches the current salt, the vehicle service subscriber system moves to element 1204 in the process where it waits for the next salt message from the vehicle service provider system. For example, the vehicle service provider system uses a timer to periodically re-broadcast the salt messages as illustrated and described in more detail with reference to FIG. 8. In an embodiment, the salt message is broadcast and repeated a maximum number of M times at intervals controlled by the timer. In an embodiment, the timer is an electronic timer, such as a quartz timer having digital electronics, an integrated circuit timer, a software timer, or a PLC having ladder logic.

FIG. 13 is a flowchart illustrating an example process for session key generation for AV operation, in accordance with at least one embodiment. At least one AV operated using the process is the same as or similar to the AV 100. In an embodiment, the process of FIG. 13 is performed by a vehicle service provider system (e.g., AV service provider system 704). Other entities, for example, a server (e.g., server 136) or a computer system (e.g., computer system 300) perform some or all of the elements of the process in other embodiments. Additionally, other embodiments of the illustrated process include more, fewer, or different elements, or elements arranged in an order that is different than that depicted.

The vehicle service provider system broadcasts (1304) a first salt to at least one vehicle service subscriber system (e.g., AV service subscriber system 708 implemented using at least one processor such as processor 304) associated with a vehicle service subscriber. The vehicle service provider system is associated with at least one vehicle.

The vehicle service provider system starts a timer associated with a duration of broadcasting the first salt within a salt message to the group of vehicle service subscriber systems. In response to the timer expiring, the vehicle service provider system broadcasts (1304) a salt message containing the first salt generated or selected at startup. The timer associated with a duration of broadcasting the first salt is reset, and the vehicle service provider system re-broadcasts (1304) a salt message containing the first salt periodically as the timer expires. For example, the timer is an electronic timer, such as a quartz timer having digital electronics, an integrated circuit timer, a software timer, or a PLC having ladder logic.

The vehicle service provider system receives (1308) a synchronization message from the vehicle service subscriber system. The synchronization message includes an entropy generated by the vehicle service subscriber system. The entropy is generated by the vehicle service subscriber system independently of the vehicle service provider system and independently of the different entropy pool of the vehicle service provider system. The entropy is a random value (integer or floating point), a pseudorandom value, a digital vector of randomly generated bits, or a combination thereof. The synchronization message is generated by the vehicle service subscriber system to contribute entropy to the next salt update.

The entropy value is adjusted by the vehicle service subscriber system using different hashing algorithms and implementations of hashing. In an embodiment, an "entropy" field in the synchronization message is a random number drawn by an vehicle service subscriber system from its own entropy pool. A "last salt" field refers to the salt value from the last salt message the vehicle service subscriber system received. For example, the "last salt" is the first salt generated by the vehicle service provider system in element 1304. In an embodiment, the vehicle service provider system enhances security by verifying that the synchronization message's "last salt" field is valid. To be valid, the synchronization message's "last salt" field value should match the vehicle service provider system's current salt (e.g., the first salt). If the verification is successful, the vehicle service provider system processes the synchronization message.

The vehicle service provider system generates (1312) a second salt based on the first salt and the entropy. For example, the vehicle service provider system updates (1308) the first salt by concatenating the current salt (e.g., the first salt) and the entropy from the received synchronization message. In an embodiment, generating the second salt includes performing, by the vehicle service provider system, an HMAC on a concatenation of the first salt and the entropy. For example, the concatenated data is passed through a hashing algorithm to produce the value of the second salt. In an embodiment, information identifying the vehicle service provider system, such as a name, identification number, or IP address, is included in the concatenated data to enhance data security.

The vehicle service provider system calculates (1316) session keys based on the second salt. In an embodiment, the session keys are calculated using an HKDF, an IKM and the second salt as illustrated and described in more detail with reference to FIG. 5. For example, the session keys are determined using an HKDF based on an HMAC. In an embodiment, the vehicle service provider system sets a timer after receiving the synchronization message and the second salt is generated by the vehicle service provider system when the timer expires. When the second salt is generated, the vehicle service provider system re-initializes its protected message (e.g., black channel message) transmitter context with the session keys derived from the second salt. In an embodiment to improve security further, prior to generating the session keys, the vehicle service provider system verifies that hash-based message authentication performed on a concatenation of the "last salt" from the vehicle service subscriber system and the entropy matches the second salt. In response to the verification failing, the vehicle service provider system signals a potential DoS attack or irregularity.

The vehicle service provider system broadcasts (1320) an update to the vehicle service subscriber system. The update includes the second salt for decrypting protected messages using the session keys. The protected messages are for used to provide a ride involving the at least one vehicle. In an embodiment, the vehicle service provider system broadcasts an extended salt update message. The salt update message is extended to accommodate at least one entropy contribution received as part of the synchronization messages from the group of vehicle service subscriber system.

An "entropy" field in the extended update denotes the entropy contributed by at least one vehicle service subscriber system. In an embodiment, security is further improved by enhancing the salt generation to prevent an attacker fabricating a salt update message and potentially causing a DoS attack against the group of vehicle service subscriber system. The salt generation is enhanced by substituting the cryptographic hash with an HMAC to prevent attackers from forging salt update messages.

Figure 14:
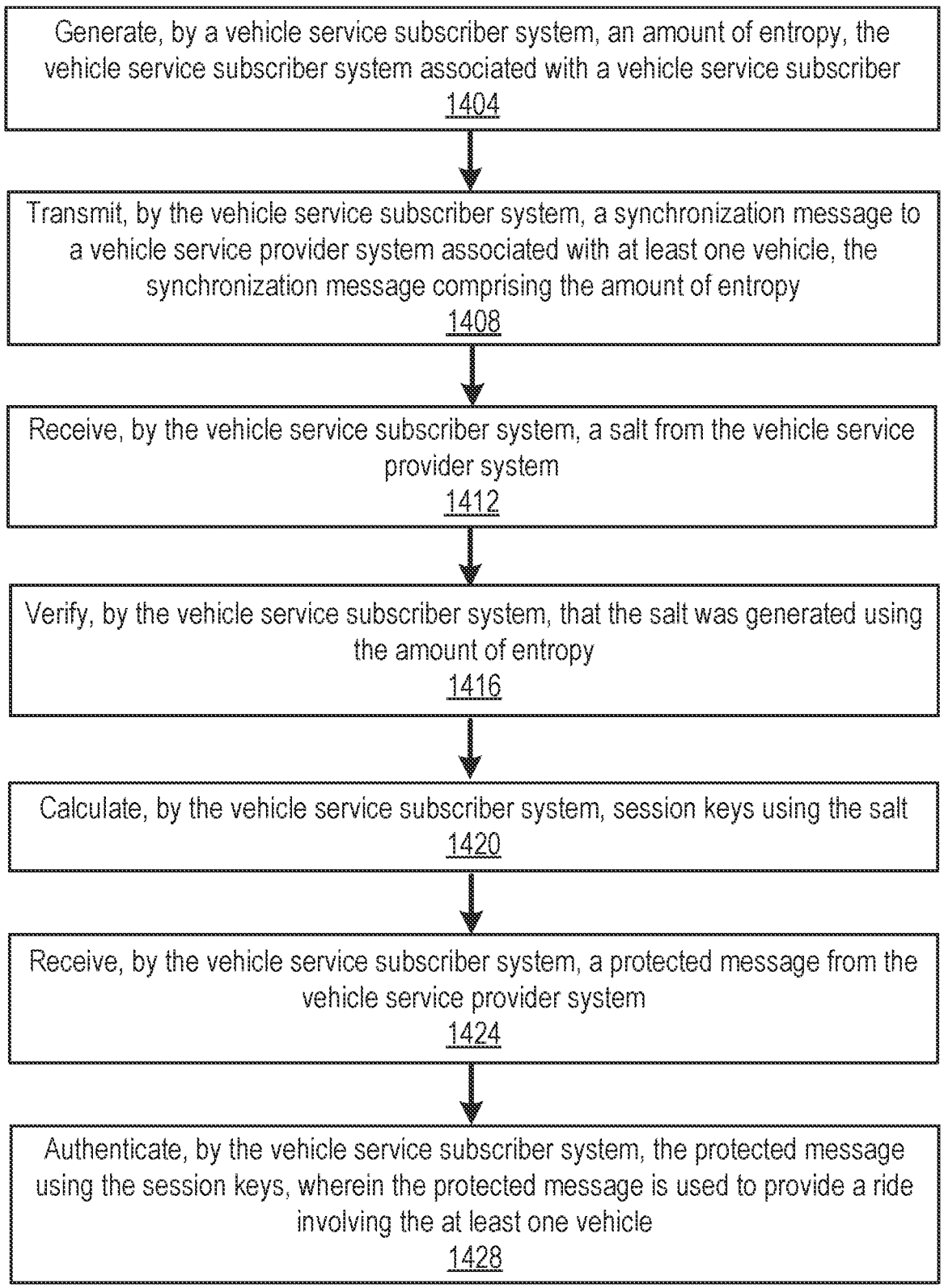
FIG. 14 is a flowchart illustrating a process for session key generation for AV operation, in accordance with at least one embodiment.

FIG. 14 is a flowchart illustrating an example process for session key generation for operation of an AV (e.g., AV 100), in accordance with at least one embodiment. In an embodiment, the process of FIG. 14 is performed by a vehicle service subscriber system (e.g., AV service subscriber system 708 implemented using at least one processor such as processor 304) in a group of vehicle service subscriber systems. Other entities, for example, a server (e.g., server 136), a computer system (e.g., computer system 300), a mobile device, or an AV system (e.g., AV system 120) perform some or all of the elements of the process in other embodiments. It will be understood that other embodiments of the process include more or fewer elements, different elements, elements arranged in a different order, etc.

The vehicle service subscriber system generates (1404) an entropy. The vehicle service subscriber system is associated with a vehicle service subscriber, which is a software client running on the vehicle service subscriber system or a user of the vehicle service subscriber system. The entropy is generated by the vehicle service subscriber system independently of the vehicle service provider system and independently of the different entropy pool of the vehicle service provider system as illustrated and described in more detail with reference to FIG. 11. The entropy is a random value (integer or floating point), a pseudorandom value, a digital vector of randomly generated bits, or a combination thereof. In an embodiment, the vehicle service subscriber system selects the entropy from an entropy pool that is independent of the different entropy pool of the vehicle service provider system.

The vehicle service subscriber system transmits (1408) a synchronization message to a vehicle service provider system associated with at least one vehicle. The synchronization message includes the entropy. In an embodiment, the vehicle service subscriber system receives a salt message indicating a lack of a scheduled salt update. Prior to the vehicle service subscriber system sending a synchronization message to the vehicle service provider system, the vehicle service subscriber system waits for at least one salt message to be broadcast by the vehicle service provider system. The salt message indicates that no salt update is currently scheduled. The vehicle service provider system discards any synchronization messages received after broadcast of a salt update has commenced. The vehicle service provider system periodically transmits a salt to the vehicle service subscriber system at regular intervals using a timer. The salt message is different from an update, which indicates a salt update is being performed by the vehicle service provider system. In an embodiment, the timer is an electronic timer, such as a quartz timer having digital electronics, an integrated circuit timer, a software timer, or a PLC having ladder logic.

The vehicle service subscriber system receives (1412) a salt from the vehicle service provider system. The salt is received within an update from the vehicle service provider system. The vehicle service subscriber system verifies that the salt was generated using the entropy that the vehicle service subscriber system contributed to the vehicle service provider system. In an embodiment, the salt is generated using an HMAC by the vehicle service provider system based on the entropy. The vehicle service subscriber system verifies that the salt is generated using an HMAC and the entropy that the vehicle service subscriber system generated and transmitted. For example, once the synchronization message has been sent, the vehicle service subscriber system waits for a salt update message to be broadcast by the vehicle service provider system.

If the vehicle service subscriber system's entropy contribution is listed, shown, or incorporated in the salt update message's entropy field and the vehicle service subscriber system verifies the determination of the new salt, the vehicle service subscriber system has successfully contributed its entropy to the salt. The vehicle service subscriber system then calculates session keys and begins authenticating protected messages. In an embodiment, the salt is generated by a cryptographic hash performed on a previous salt (received by the vehicle service subscriber system) using the entropy. For example, the vehicle service provider system uses a hash function to take the entropy and generate the salt of a fixed-size including enciphered text.

The vehicle service subscriber system verifies (1416) that the salt was generated using the entropy. In an embodiment, if the vehicle service subscriber system determines that its entropy contribution is not listed or incorporated in the salt update message or if the salt verification fails, the vehicle service subscriber system retries the synchronization message element. In an embodiment, the vehicle service subscriber system sends a warning message to the vehicle service provider system indicating a potential replay attack. The vehicle service subscriber system does not trust a broadcast salt until the vehicle service subscriber system's entropy contribution is incorporated by the vehicle service provider system into the salt. The subscriber attempts to verify this incorporation, and if the verification is successful, the salt is considered trusted by the vehicle service subscriber system. Only a trusted salt is used by the vehicle service subscriber system to calculate session keys for authenticating protected messages from the vehicle service provider system.

The vehicle service subscriber system calculates (1420) session keys using the salt. The session keys are for the communication session with the vehicle service provider system. The session keys are calculated in a manner similar to or in the same manner as that described in more detail elsewhere herein. In an embodiment, the salt received by the vehicle service subscriber system from the vehicle service provider system is a first salt and the entropy generated by the vehicle service subscriber system and transmitted is a first entropy. The vehicle service subscriber system that generates the first entropy is a first vehicle service subscriber system of the group of vehicle service subscriber systems. The session keys calculated by the first vehicle service subscriber system are first session keys. The first vehicle service subscriber system receives an update from the vehicle service provider system. The update includes a second salt generated using a second entropy generated by a second vehicle service subscriber system of the group of vehicle service subscriber systems. For example, the vehicle service subscriber system is requesting an AV ride for a passenger in another vehicle associated with the vehicle service provider system. The first vehicle service subscriber system calculates second session keys using the second salt. The second session keys are calculated using a process same as or similar to the process described in more detail with reference to FIG. 11.

The vehicle service subscriber system receives (1424) a protected message from the vehicle service provider system. The vehicle service subscriber system authenticates the protected message using the session keys for providing a ride in at least one vehicle associated with the vehicle service provider system. If the protected message authentication fails, the vehicle service subscriber system waits for the next salt message. In an embodiment, the vehicle service subscriber system initializes a protected message receiver for receiving protected messages from the vehicle service provider system in response to verifying that the salt was generated using the entropy. Once the protected message is authenticated and the salt is trusted, the vehicle service subscriber system initializes its protected message receiver to receive and decrypt further black channel messages associated with providing an AV ride.

The vehicle service subscriber system authenticates (1428) the protected message using the session keys. The protected message is used to provide a ride involving the at least one vehicle associated with the vehicle service provider system. If the authentication of the protected message using the session keys succeeds, the vehicle service subscriber system has the correct session keys for the session. The vehicle service subscriber system consumes the protected message and ignores future salt messages it receives during the session. The vehicle service subscriber system does not become desynchronized from the vehicle service provider system and authenticates protected messages from the vehicle service provider system using the same session keys for the duration of the session.

In the foregoing description, embodiments of the invention have been described with reference to numerous specific details that may vary from implementation to implementation. The description and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further including," in the foregoing description or following claims, what follows this phrase can be an additional element or entity, or a sub-element/sub-entity of a previously-recited element or entity.

What is claimed is:

1. A method comprising:
generating, by a vehicle service subscriber system having at least one processor, an entropy, the vehicle service subscriber system associated with a vehicle service subscriber;
receiving, by the vehicle service subscriber system using the at least one processor, a salt message from the vehicle service provider system indicating a lack of a scheduled salt update;
responsive to receipt of the salt message, transmitting, by the vehicle service subscriber system using the at least one processor, a synchronization message to a vehicle service provider system associated with at least one vehicle, the synchronization message comprising the entropy;

receiving, by the vehicle service subscriber system using the at least one processor, a salt from the vehicle service provider system;

verifying, by the vehicle service subscriber system using the at least one processor, that the salt was generated using the entropy;

calculating, by the vehicle service subscriber system using the at least one processor, session keys using the salt;

receiving, by the vehicle service subscriber system using the at least one processor, a protected message from the vehicle service provider system; and authenticating, by the vehicle service subscriber system using the at least one processor, the protected message using the session keys, wherein the protected message is used to provide a ride involving the at least one vehicle.

2. The method of claim 1, wherein the vehicle service subscriber system receives the salt within an update from the vehicle service provider system, and a first frequency of transmission of the salt message is greater than a second frequency of transmission of the update.

3. The method of claim 1, further comprising:
determining, by the vehicle service subscriber system using the at least one processor, that the salt excludes the entropy;
waiting, by the vehicle service subscriber system using the at least one processor, for the salt message from the vehicle service provider system indicating the lack of the scheduled salt update; and
re-transmitting, by the vehicle service subscriber system using the at least one processor, the synchronization message.

4. The method of claim 1, further comprising:
determining, by the vehicle service subscriber system using the at least one processor, that the salt excludes the entropy; and
transmitting, by the vehicle service subscriber system using the at least one processor, a message to the vehicle service provider system indicating a possible replay attack.

5. The method of claim 1, wherein the session keys are calculated using a hashed key derivation function, an input key material and the salt.

6. The method of claim 1, wherein the salt is generated using a hash-based message authentication code based on the entropy.

7. The method of claim 1, further comprising initializing, by the vehicle service subscriber system using the at least one processor, a protected message receiver for receiving the protected message from the vehicle service provider system responsive to verifying that the salt was generated using the entropy.

8. The method of claim 1, wherein the vehicle service subscriber system receives the salt responsive to transmitting a request to the vehicle service provider system for the ride in the at least one vehicle.

9. The method of claim 1, wherein the salt is generated by a cryptographic hash performed on a previous salt using the entropy.

10. The method of claim 9, wherein the previous salt comprises pseudorandom data generated by the vehicle service provider system.

11. The method of claim 9, further comprising:
determining, by the vehicle service subscriber system using the at least one processor, that an update indicates that the previous salt is valid until a particular time, wherein the vehicle service subscriber system receives the salt from the vehicle service provider system within the update; and
decrypting, by the vehicle service subscriber system using the at least one processor, protected messages based on the previous salt, the protected messages for providing the ride in the at least one vehicle.

12. The method of claim 1, wherein the vehicle service subscriber system is one of a plurality of vehicle service subscriber systems, and the salt comprises a chained plurality of elements, wherein each element of the chained plurality of elements is generated using a different entropy generated by a respective vehicle service subscriber system of the plurality of vehicle service subscriber systems.

13. The method of claim 12, wherein the salt is a first salt, the entropy is a first entropy, the vehicle service subscriber system is a first vehicle service subscriber system of the plurality of vehicle service subscriber systems, and the session keys are first session keys, the method further comprising:
receiving, by the first vehicle service subscriber system using the at least one processor, an update from the vehicle service provider system, the update comprising a second salt generated using a second entropy generated by a second vehicle service subscriber system of the plurality of vehicle service subscriber systems; and
calculating, by the first vehicle service subscriber system using the at least one processor, second session keys using the second salt for providing the ride in the at least one vehicle.

14. The method of claim 13, wherein the protected message is a first protected message, the method further comprising:
determining, by the vehicle service subscriber system using the at least one processor, that the second session keys fail to authenticate a second protected message received from the vehicle service provider system; and
transmitting, by the vehicle service subscriber system using the at least one processor, a replay warning message to the vehicle service provider system indicating a possible replay attack.

15. The method of claim 1, wherein a maximum number of vehicle service subscriber systems allowed to join a service session administered by the vehicle service provider system is limited to a threshold number of vehicle service subscriber systems specified by the vehicle service provider system.

16. The method of claim 1, wherein the salt is a first salt, the method further comprising:
receiving, by the vehicle service subscriber system using the at least one processor, a second salt from the vehicle service provider system, the second salt excluding a scheduled salt update associated with the second salt; and
transmitting, by the vehicle service subscriber system using the at least one processor, a replay warning message to the vehicle service provider system indicating a possible replay attack.

17. The method of claim 1, wherein the protected message is a black channel message.

18. A vehicle service subscriber system comprising:
at least one computer processor; and at least one non-transitory storage media storing instructions which, when executed by the at least one computer processor, are to cause the vehicle service subscriber system to:
generate an entropy;
receive a salt message from the vehicle service provider system indicating a lack of a scheduled salt update;
responsive to receipt of the salt message, transmit a synchronization message to a vehicle service provider system associated with at least one vehicle, the synchronization message comprising the entropy;
receive a salt from the vehicle service provider system;
verify that the salt was generated using the entropy;
calculate session keys using the salt;
receive a protected message from the vehicle service provider system; and
authenticate the protected message using the session keys, wherein the protected message is used to provide a ride involving the at least one vehicle.

19. At least one non-transitory storage media storing instructions which, when executed by at least one computer processor of a vehicle service subscriber system, are to cause the vehicle service subscriber system to:
generate an entropy;
receive a salt message from the vehicle service provider system indicating a lack of a scheduled salt update;
responsive to receipt of the salt message, transmit a synchronization message to a vehicle service provider system associated with at least one vehicle, the synchronization message comprising the entropy;
receive a salt from the vehicle service provider system;
verify that the salt was generated using the entropy;
calculate session keys using the salt;
receive a protected message from the vehicle service provider system; and
authenticate the protected message using the session keys, wherein the protected message is used to provide a ride involving the at least one vehicle.

* * * * *